(12) United States Patent
Jacobs et al.

(10) Patent No.: US 9,292,243 B2
(45) Date of Patent: Mar. 22, 2016

(54) USER INTERFACE FOR A LABEL PRINTER

(71) Applicant: SANFORD, L.P., Oak Brook, IL (US)

(72) Inventors: Ron Jacobs, Acworth, GA (US); Stephen Charles Gohde, Atlanta, GA (US); Stephen Spencer, Atlanta, GA (US); Bram Boot, Borgerhout (BE); Latha Airodi, Suwanee, GA (US); Nancy Elaine Taylor, Lawrenceville, GA (US); David G. Nesfeder, Jr., Gainesville, GA (US)

(73) Assignee: SANFORD, L.P., Downers Grove, IL (US)

( * ) Notice: Subject to any disclaimer, the term of this patent is extended or adjusted under 35 U.S.C. 154(b) by 0 days.

(21) Appl. No.: 14/213,418

(22) Filed: Mar. 14, 2014

(65) Prior Publication Data

US 2014/0198323 A1    Jul. 17, 2014

Related U.S. Application Data

(63) Continuation-in-part of application No. 13/529,943, filed on Jun. 21, 2012.

(60) Provisional application No. 61/787,623, filed on Mar. 15, 2013.

(51) Int. Cl.
*G06F 3/12*     (2006.01)
*G06K 15/02*    (2006.01)
*B41J 3/407*    (2006.01)
*B41J 3/46*     (2006.01)

(52) U.S. Cl.
CPC ............ *G06F 3/1253* (2013.01); *B41J 3/4075* (2013.01); *B41J 3/46* (2013.01); *G06F 3/1204* (2013.01); *G06K 15/024* (2013.01)

(58) Field of Classification Search
CPC ...... G09G 5/00; G06K 15/024; G06F 3/1253; G06F 3/1024; B41J 3/4075; B41J 3/46
USPC .......................................................... 347/110
See application file for complete search history.

(56) References Cited

U.S. PATENT DOCUMENTS

| | | | |
|---|---|---|---|
| 7,554,521 B1 * | 6/2009 | Migos et al. | 345/156 |
| 2011/0074710 A1 * | 3/2011 | Weeldreyer et al. | 345/173 |
| 2011/0286012 A1 * | 11/2011 | De Munck et al. | 358/1.6 |
| 2011/0292416 A1 * | 12/2011 | Tsai | 358/1.9 |

FOREIGN PATENT DOCUMENTS

| EP | 2244180 A2 | 10/2010 |
|---|---|---|
| EP | 2413226 A2 | 2/2012 |

OTHER PUBLICATIONS

International Search Report for Application No. PCT/EP2014/055171 dated Jun. 10, 2014.
Written Opinion for International Application No. PCT/EP2014/055171 dated Jun. 10, 2014.

* cited by examiner

*Primary Examiner* — Sarah Al Hashimi
(74) *Attorney, Agent, or Firm* — Marshall, Gerstein & Borun LLP

(57) ABSTRACT

A method including providing a first image on a label printer user interface, wherein the first image is representative of a label to be printed or an object to which a label is to be applied; and providing a second image on the user interface associated with the first image, said second image representative of a dimension of the first image; enabling a user to modify a dimension of the second image; wherein as the dimension of said second image is modified, the dimension of the first image is correspondingly updated.

11 Claims, 16 Drawing Sheets

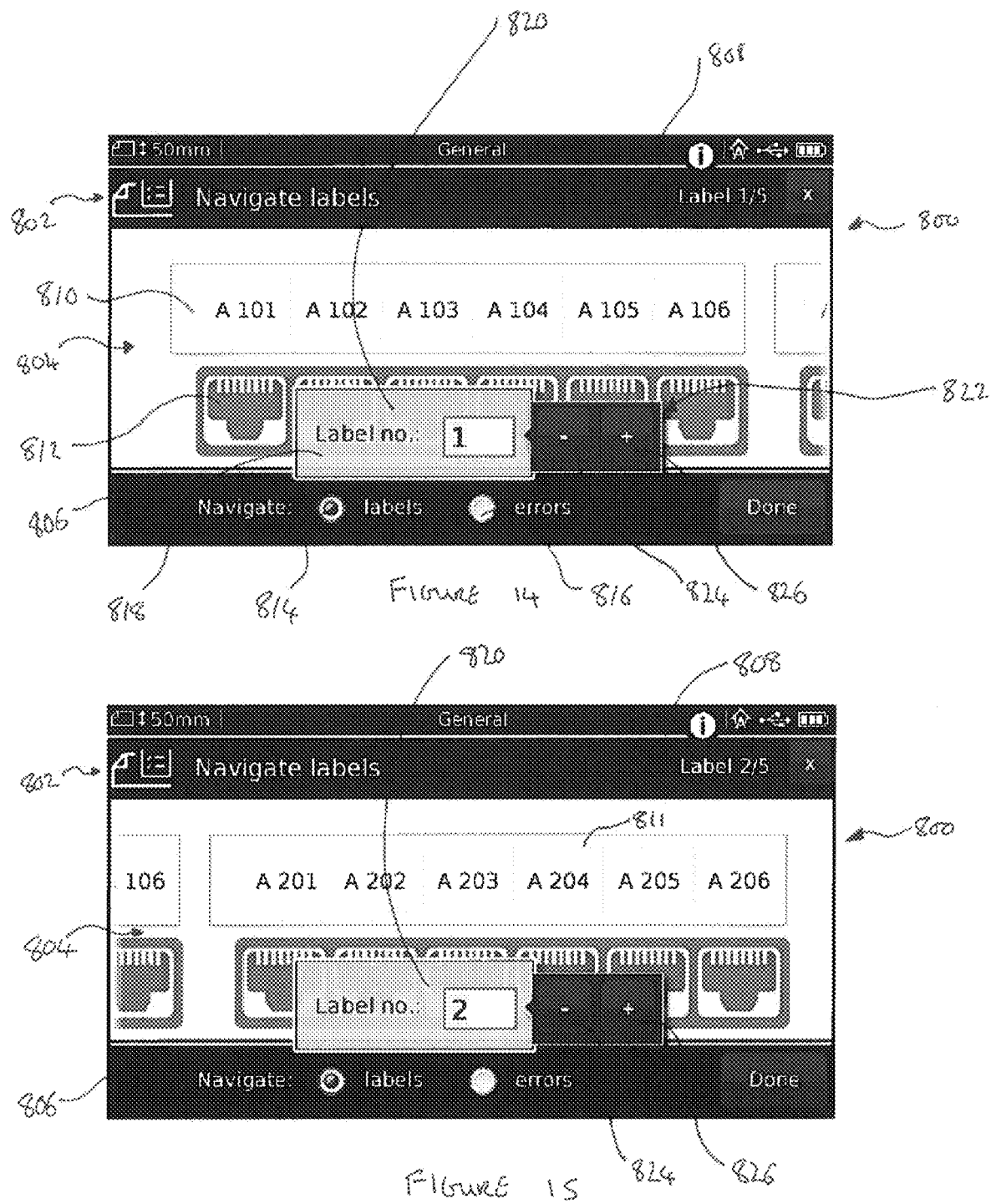

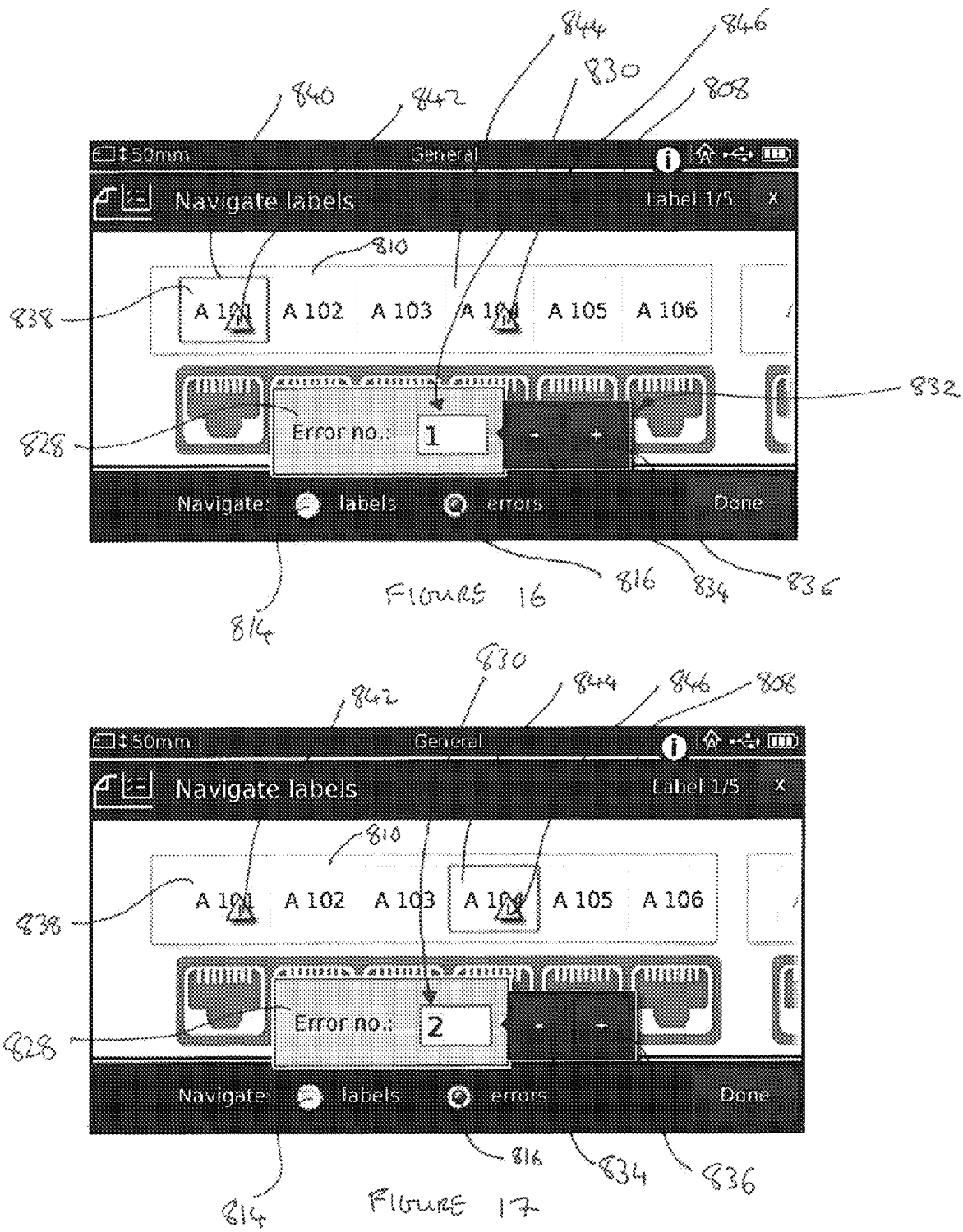

USER INTERFACE FOR A LABEL PRINTER

CROSS-REFERENCE TO RELATED APPLICATION

This is a continuation-in-part of U.S. patent application Ser. No. 13/529,943, filed Jun. 21, 2012, and this is also a non-provisional, claiming the benefit of the Mar. 15, 2013 filing date of U.S. Provisional Patent Application No. 61/787,623. The priority applications, U.S. patent application Ser. No. 13/529,943 and U.S. Provisional Patent Appl. No. 61/787,623, are hereby incorporated by reference. U.S. patent application Ser. No. 13/529,943 is also included as an appendix hereto.

FIELD OF THE DISCLOSURE

The present disclosure relates to a user interface for a label printer, and aspects associated with the user interface.

BACKGROUND

Known label printing apparatuses are disclosed in EP-A-322918 and EP-A-322919 (Brother Kogyo Kabushiki Kaisha) and EP-A-267890 (Varitronic). The label printing apparatuses each include a cassette receiving bay for receiving a cassette or tape holding case. In EP-A-267890, the tape holding case houses an ink ribbon and a substrate tape, the latter comprising an upper image receiving layer secured to a backing layer by an adhesive. In EP-A-322918 and EP-A-322919, the tape holding case houses an ink ribbon, a transparent image receiving tape and a double sided adhesive tape which is secured at one of its adhesive coated sides to the image tape after printing and which has a backing layer peelable from its other adhesive coated side. With both these apparatus, the image transfer medium (ink ribbon) and the image receiving tape (substrate) are in the same cassette.

It has also been proposed by the present applicants in, for example, EP-A-578372 to house the ink ribbon and the substrate tape in separate cassettes.

In all of these cases, the image receiving tape passes in overlap with the ink ribbon to a print zone consisting of a fixed print head and a platen against which the print head can be pressed to cause an image to transfer from the ink ribbon to the image receiving tape. There are many ways of doing this, including dry lettering or dry film impression, but the most usual way currently is by thermal printing where the print head is heated and the heat causes ink from the ink ribbon to be transferred to the image receiving tape.

In other known tape printing apparatuses, so-called direct thermal tapes are used, in which an image is created directly onto the direct thermal tape without the interposition of an ink ribbon cassette. Elements of a print head are heated, and the heat causes chemicals within the direct thermal tape to react and produce an image in or on the tape.

The apparatuses of the type described above are provided with a keyboard which enables a user to enter characters, symbols and the like to form an image to be printed by the tape printer. The keyboard usually has text character keys and number keys for entering letters and numbers respectively, plus some function keys which, among other things, operate menus and allow printing attributes to be set.

"Stand-alone" label printers can be distinguished from "label printer systems", which comprise a printer connected to a PC or other computing device. In such label printer systems, a user creates or edits a label for printing using a PC, and then sends print data to a printer to cause the printer to print the print data onto a label medium. In such label printer systems, the user will view a display of the PC to create a label, rather than a display of the printer. Also, the label-editing software used for creating the label will be stored and run on the PC, rather than the printer.

In contrast, stand-alone label printers are operable independently of a PC or other computer to create and print a label. Although some stand-alone printers are connectable to a PC or other computer to receive some data, they are nevertheless operable independently of the PC or other computer to create a label for printing, since label-editing software used for creating the label is stored and run on the label printer itself. Stand-alone label printers thus usually include an integral display via which the user can view an interface of the label-editing software.

SUMMARY OF DISCLOSURE

In a first aspect there is provided a method comprising: providing a first image on a label printer user interface, wherein said first image is representative of a label to be printed or an object to which a label is to be applied; and providing a second image on said user interface associated with said first image, said second image representative of a dimension of said first image; enabling a user to modify a dimension of said second image; wherein as said dimension of said second image is modified, said dimension of said first image is correspondingly updated.

Preferably a numerical value of said dimension of said second image is displayed on said user interface, and wherein said numerical value is correspondingly updated as said dimension of the second image is modified.

Preferably said numerical value is displayed adjacent said second image.

Preferably said numerical value is displayed in a toolbar region of said user interface.

Preferably said dimension of said first image comprises one of a length and width of the label to be printed or object to which a label is to be applied.

Preferably said dimension of said first image comprises a distance between labels to be printed or objects to which a label is to be applied.

Preferably said second image comprises an arrow.

Preferably modifying a dimension of said second image comprises selecting and dragging an end of said second image.

Preferably modifying said second image comprises selecting an end of said second image at a first position on said user interface, and subsequently selecting a second position on said user interface.

In a further aspect there is provided a computer program comprising computer program code means adapted to perform the method described above when said program is run on a computer.

In a further aspect there is provided an apparatus comprising a controller configured: to output, to a display driver, data for causing the display driver to drive a display to display a first image on a label printer user interface, wherein said first image is representative of a label to be printed or an object to which a label is to be applied; and to display a second image on said user interface associated with said first image, said second image representative of a dimension of said first image; said controller being configured to enable a user to modify a dimension of said second image; wherein as said dimension of said second image is modified, said controller is configured to cause said dimension of said first image to be correspondingly updated.

Preferably said controller is configured to output data for causing the display to display a numerical value of said dimension of said second image on said user interface, and wherein said numerical value is correspondingly updated as said dimension of the second image is modified.

Preferably said controller is configured to cause said numerical value to be displayed adjacent said second image.

Preferably said controller is configured to cause the numerical value to be displayed in a toolbar region of said user interface.

Preferably said dimension of said first image comprises one of a length and width of the label to be printed or object to which a label is to be applied.

Preferably said dimension of said first image comprises a distance between labels to be printed or objects to which a label is to be applied.

Preferably said second image comprises an arrow.

Preferably said controller is configured to cause said modifying a dimension of said second image responsive to an operation of selecting and dragging an end of said second image.

Preferably said controller is configured to cause said modifying said dimension of said second image responsive to an operation of selecting an end of said second image at a first position on said user interface, and subsequently selecting a second position on said user interface.

In a further aspect there is provided a method comprising: providing, on a display, a user interface for a label printer; displaying on said user interface a first screen associated with a label creation process; and in response to selecting, with a selector, a first position on said display and moving said selector to a second position on said display, displaying on said user interface a second screen associated with said label creation process, wherein said second screen is different from said first screen.

Preferably said selector comprises a user-controlled pointer on said display.

Alternatively said display comprises a touch-screen, and said selector comprises one of a user's finger and a stylus.

Preferably said second point is vertically disposed from said first point.

Preferably said second point is horizontally disposed from said first point.

Preferably a content of the second screen displayed on said user interface is dependent on a direction in which said selector is moved on said display.

Preferably in response to the selector being moved from right to left on said display, said user interface advances to a subsequent step of the label creation process.

Preferably in response to the selector being moved from left to right on said display, said user interface moves to a previous step of the label creation process.

Preferably said label creation process comprises a label creation wizard.

Preferably said user interface comprises an indicator for indicating to a user their progress in the label creation process.

Preferably said indicator automatically updates in response to moving from said first screen to said second screen.

In a further aspect there is provided a computer program comprising computer program code means adapted to perform the method described above when said program is run on a computer.

In a further aspect there is provided an apparatus comprising a controller configured: to output, to a display driver, data for causing the display driver to drive a display to display a user interface for a label printer; and to display on said user interface a first screen associated with a label creation process; and in response to detecting selection of a first position on said display by a selector and movement of said selector to a second position on said display, said controller configured to cause said display to display on said user interface a second screen associated with said label creation process, wherein said second screen is different from said first screen.

Preferably said selector comprises a user-controlled pointer on said display.

Preferably said display comprises a touch-screen, and said selector comprises one of a user's finger and a stylus.

Preferably said second point is vertically disposed from said first point.

Preferably said second point is horizontally disposed from said first point.

Preferably a content of the second screen displayed on said user interface is dependent on a direction in which said selector is moved on said display.

Preferably in response to detecting movement of the selector from right to left on said display, said controller is configured to cause the user interface to advance to a subsequent step of the label creation process.

Preferably in response to detecting movement of the selector from left to right on said display, said user interface moves to a previous step of the label creation process.

Preferably said label creation process comprises a label creation wizard.

Preferably said controller is configured to cause the user interface to display an indicator for indicating to a user their progress in the label creation process.

Preferably said controller is configured to cause the indicator to automatically update in response to movement from said first screen to said second screen.

In a further aspect there is provided a method comprising: displaying on a user interface an error-counter associated with a number of errors in a label creation process; enabling a user to cycle through each error of the error-counter; wherein an error associated with a displayed error number of the error counter is displayed in a preview region of the user interface.

Preferably a visual indicator is displayed adjacent to the displayed error.

Preferably an image of an object or label containing the error is centred in the preview region.

Preferably a label number indicator is provided informing a user which label of a series of labels said displayed error is associated with.

Preferably the error counter comprises a pop-up window which at least partially overlays said preview region.

Preferably the error counter comprises at least one associated icon which, when activated by a user, causes the count of the error counter to increase.

Preferably the error counter comprises at least one associated icon which, when activated by a user, causes the count of the error counter to decrease.

In a further aspect there is provided a computer program comprising computer program code means adapted to perform the method described above when said program is run on a computer.

In a further aspect there is provided an apparatus comprising a controller configured: to output, to a display driver, data for causing the display driver to drive a display to display on a user interface an error-counter associated with a number of errors in a label creation process; said controller configured to enable a user to cycle through each error of the error-counter; and wherein said controller is configured to cause an error associated with a displayed error number of the error counter to be displayed in a preview region of the user interface.

Preferably the controller is configured to cause a visual indicator to be displayed adjacent to the displayed error.

Preferably the controller is configured to cause an image of an object or label containing the error to be centred in the preview region.

Preferably the controller is configured to cause a label number indicator to be displayed informing a user which label of a series of labels said displayed error is associated with.

Preferably the error counter comprises a pop-up window which at least partially overlays said preview region.

Preferably the error counter comprises at least one associated icon, and wherein in response to activation of said icon by a user, the controller is configured to cause the count of the error counter to increase.

Preferably the error counter comprises at least one associated icon, and wherein in response to activation of said icon by a user, the controller is configured to cause the count of the error counter to decrease.

In a further aspect there is provided a method comprising: controlling a label printer user interface to display, in a first region, a preview of a label to be printed; and to display, in a second region, at least one icon associated with a plurality of options for creating a label; and wherein, following selection of said at least one icon by a user, said plurality of options are displayed to said user, such that said displayed plurality of options at least partially overlays said first region.

Preferably said first region further displays an image of an object associated with said label to be printed.

Preferably a size of said first region remains constant.

Preferably said plurality of options are displayed as a list.

Preferably said plurality of options are displayed as a menu.

Preferably said displayed plurality of options does not overlay said second region.

Preferably said displayed plurality of options comprises an indicator pointing to said selected icon.

Preferably a plurality of icons are displayed in said second region, and following selection of a second icon a plurality of options associated with said second icon are displayed.

Preferably in response to selection of said second icon, said indicator points to said second icon.

In a further aspect there is provided a computer program comprising computer program code means adapted to perform the method described above when said program is run on a computer.

In a further aspect there is provided an apparatus comprising a controller configured: to output, to a display driver, data for causing the display driver to drive a display to display in a first region of a user interface a preview of a label to be printed; and to display, in a second region, at least one icon associated with a plurality of options for creating a label; and wherein, following selection of said at least one icon by a user, said controller is configured to cause said plurality of options to be displayed to said user, such that said displayed plurality of options at least partially overlays said first region.

Preferably said controller is further configured to cause an image of an object associated with said label to be printed to be displayed in said first region.

Preferably said controller is configured to cause a size of said first region to remain constant.

Preferably said controller is configured to cause said plurality of options to be displayed as a list.

Preferably said controller is configured to cause said plurality of options to be displayed as a menu.

Preferably said controller is configured to display said plurality of options such that said plurality of options does not overlay said second region.

Preferably said controller is configured to provide said displayed plurality of options with an indicator pointing to said selected icon.

Preferably said controller is configured to cause a plurality of icons to be displayed in said second region, and following selection of a second icon a said controller is configured to cause a plurality of options associated with said second icon to be displayed.

Preferably in response to selection of said second icon, said controller is configured to cause said indicator to point to said second icon.

BRIEF DESCRIPTION OF DRAWINGS

Embodiments will now be described, by way of example only, with reference to the accompanying figures in which:

FIG. 15 shows a progression of the user interface of FIG. 14;

FIG. 16 shows a user interface according to a further embodiment;

FIG. 17 shows a progression of the user interface of FIG. 16;

DETAILED DESCRIPTION

Figure 1:
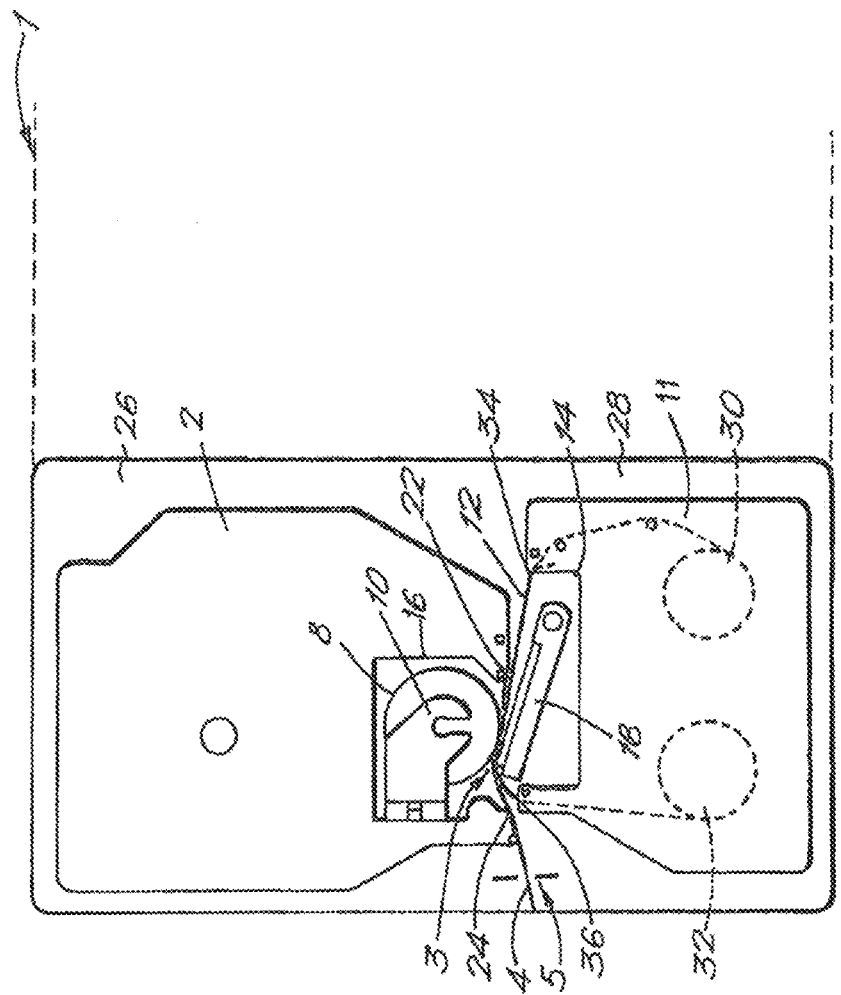
FIG. 1 is a plan view showing certain parts of one type of label printing system.

FIG. 1 shows in plan view a first label printer which has two cassettes arranged therein. Typically, this label printer 1 is powered by batteries at least part of the time. Alternatively the label printer may be mains powered.

The upper cassette is located in a first cassette receiving portion 26 and contains a supply of image receiving tape 4 which passes through a print zone 3 of the label printer 1 to an outlet 5 of the label printer 1. The image receiving tape 4 comprises an upper layer for receiving a printed image on its upper surface and has its other surface coated with an adhesive layer to which is secured a releasable backing layer. The upper cassette 2 has a recess for accommodating a platen 8 of the label printer 1, and guide portions 22 and 24 for guiding the tape through a print zone 3. The platen 8 is mounted for rotation within a cage moulding 10. Alternatively the platen could be mounted for rotation on a pin.

The lower cassette 11 is located in the second cassette receiving portion 28 and contains a thermal transfer ribbon 12 which extends from the supply spool 30 to a take-up spool 32 within the cassette 11. The thermal transfer ribbon 12 extends through the print zone 3 in overlap with the image receiving tape 4. The cassette 11 has recess 14 for receiving a print head 18 of the label printer 1 and guide portions 34 and 36 for guiding the thermal transfer ribbon 12 through the print zone 3. Print head 18 is moveable between an operative position shown in FIG. 1, in which it is in contact with the platen 8 and holds the thermal transfer ribbon 12 and the image receiving tape 4 in overlap between a print head 18 and the platen 8, and an inoperative position in which it is moved away from the platen 8 to release thermal transfer ribbon 12 and image receiving tape 4. In the operative position, the platen 8 is rotated to cause the image receiving tape 12 to be driven past print head 18 and the print head 18 is controlled to print an image on the image receiving tape 4 by thermal transfer of ink from the ribbon 12. Each of the printing elements on the print head 18 is activatable separately and is activated in accordance with the desired image to be printed. The label printer 1 has a lid (which is not shown) which is hinged along the rear of the cassette receiving portions 26 and 28 and which covers both cassettes when in place.

A DC motor 7 (see FIG. 3) continuously drives the platen 8. The platen is arranged to drive the image receiving tape 4 through the print zone 3 by the actuation of its own rotation. In other embodiments, transport of the image receiving tape across the print head can be done by other means, such as by a separate driven roller of the printer or of the cassette, or by a pair of cooperating rollers positioned on opposite sides of the tape, or by other means.

The image is printed by the print head 18 on the image receiving tape on a column by column basis with the columns being adjacent one another in the direction of movement of the tape 4.

Figure 2:
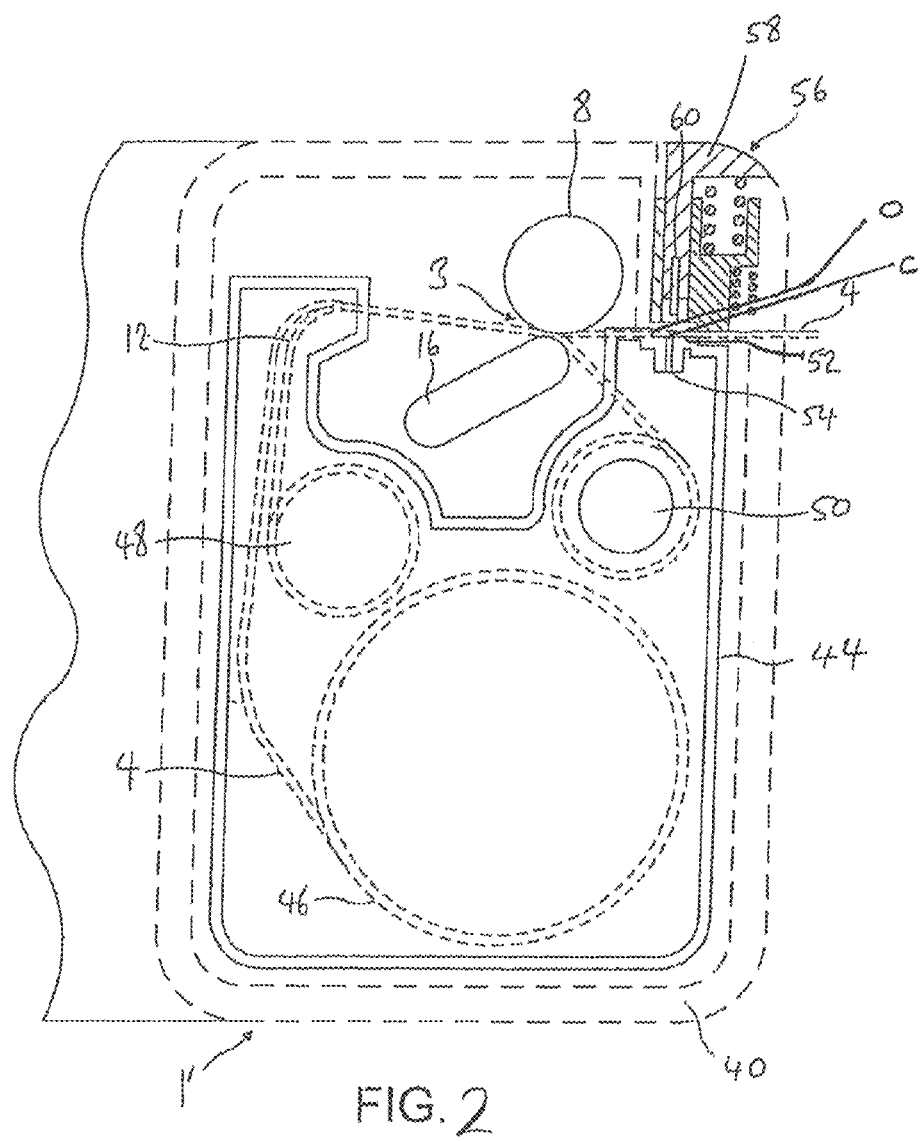
FIG. 2 is a plan view showing certain parts of another type of label printing system.

FIG. 2 illustrates in plan view a cassette bay of a second label printer 1' which uses a one cassette system. Like reference numerals are used for those parts which are also shown in FIG. 1. The cassette bay is shown by the dotted line 40. The cassette bay 40 includes a thermal print head 18 and a platen 8 which cooperate to define a print zone 3.

The print head 18 is pivotable about a pivot point so that it can be brought into contact with the platen 8 for printing and moved away from the platen 8 to enable the cassette to be removed and replaced as in the first embodiment. Alternatively the platen is pivotable so that it can be brought into contact with the printhead for printing and moved away from the printhead to enable the cassette to be inserted. A cassette inserted into the cassette bay 40 is denoted generally by reference numeral 44. The cassette 44 holds a supply spool 46 of image receiving tape 4. The image receiving tape 4 is guided by a guide mechanism (which is not shown) through the cassette 44, past the print zone 3 and out of the cassette 44 through an outlet O to a cutting location C. The same cassette 44 also has an ink ribbon supply spool 48 and an ink ribbon take up spool 50. The ink ribbon 12 is guided from the ink ribbon supply spool 48 through the print zone 3 and taken up on the ink ribbon take up spool 50. As with the first embodiment, the image receiving tape 4 passes in overlap with the ink ribbon 12 through the print zone 3 with its image receiving layer in contact with the ink ribbon 12. The platen of this second embodiment is also driven by a motor 7. The motor rotates to drive continuously the image receiving tape through the print zone 3 during printing. In either of the embodiments, it is possible that the tape be driven in a step wise manner by a stepper motor.

An image is printed on the tape fed out from the print zone to the cutting location C which is provided at a location in a portion of the wall of the cassette 44 which is close to the print zone 3. The portion of the wall on the cassette 44 where the cutting location C is defined is denoted by reference 52. A slot 54 is defined in the wall portion 52 and the image receiving tape 4 is fed past the print zone 3 and out of the cassette 44 through an outlet O to the cutting location C where it is supported by facing wall portions on either side of the slot 54.

The second label printing device 1' includes a cutting mechanism 56 including a cutter support member 58 which carries a blade 60. The blade 60 cuts the image receiving tape 4 and then enters the slot 54. It should be appreciated that the first embodiment will usually also include a cutting mechanism.

These example label printers 1 and 1' may act as stand-alone printing devices including a controller for receiving inputs from a user and to alter what is displayed on a display of the printing devices. Furthermore, the label printers 1 and 1' may also be connectable or connected to a PC, in which case the PC also includes a controller to receive inputs from a user and to alter what is displayed on a display of the printer or of the PC.

Figure 3:
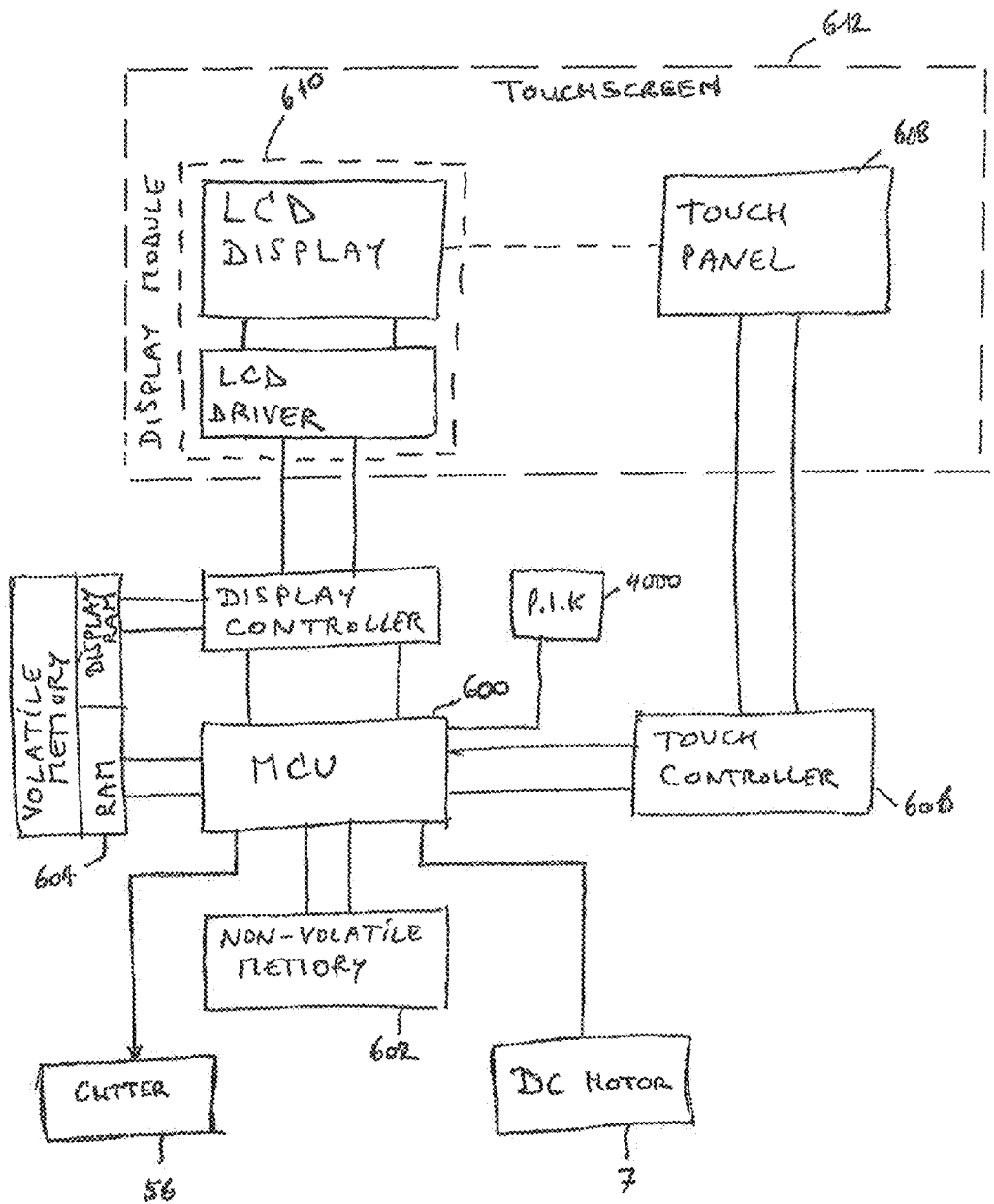
FIG. 3 is a schematic diagram of certain parts of a label printing system.

Basic circuitry for controlling the label printer 1 of FIG. 1 or the label printer 1' of FIG. 2 is shown in FIG. 3. There is a controller or "control means" (such as a micro controller unit (MCU) or processor) 600, a non-volatile memory 602 which is for example a read only memory (ROM) or a flash type of memory. The flash type of memory may be used in place of, or in addition to the read only memory. A volatile memory comprising a random access memory RAM 604 and/or display RAM is also provided. The MCU 600 is connected to receive label data input to it from a data input device such as a touch panel 608 of a touchscreen 612 via a touch panel controller 606. In alternative embodiments, the data input device may comprise one or more of a hardware keyboard including plural keys, a mouse, a digital pen or tracker ball, or any other means for enabling a user to send commands to the controller 600. In some embodiments, the touchscreen 612 is omitted. The MCU 600 outputs data to drive the display 610 (which together with the touch panel 608 form the touchscreen 612) to display a label to be printed (or a part thereof) and/or a message for the user. Additionally, the MCU 600 also outputs data to drive the print head 18 so that the label data is printed onto the image receiving tape to form a label. Finally, the MCU 600 also controls the motor 7 for driving the platen. The MCU 600 may also control the cutting mechanism 56 of FIG. 2 or a cutting mechanism of the device shown in FIG. 1 to allow a length of tape to be cut off. In alternative embodiments at least part of the cutting mechanism may be manually operated.

It should also be understood that where the label printer 1 or 1' is connected to an external apparatus such as a PC, then the PC also contains similar components such as at least one memory and at least one processor to enable the PC to carry out the operations of creating a label to be printed. Such a PC will also be connected to a display means such as a monitor.

Hereafter it should be understood that labels may be created on either or both of the label printing apparatus itself or on an external apparatus such as a PC connected to the label printer. Accordingly, it shall be understood that hereafter terms such as "memory", "processor" and "display" may refer to these components on either or both of a label printing apparatus and a PC.

Figure 4:
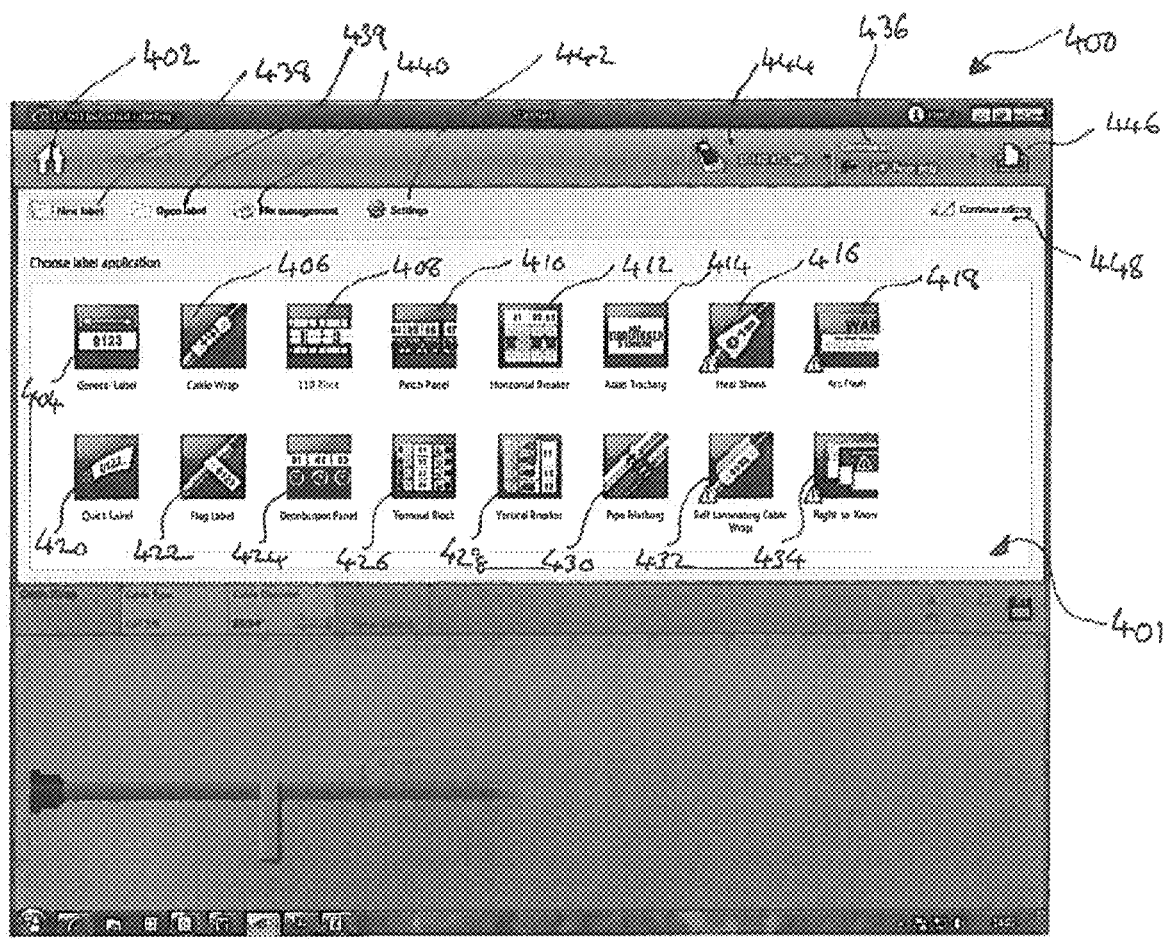
FIG. 4 shows a user interface according to an embodiment.

FIG. 4 generally shows a user interface 400 according to an embodiment. The user interface 400 may be presented on a monitor of a PC or on a display of a label printing apparatus. A user can navigate about the user interface 400 by known means. For example the user may operate a mouse or trackerball and can select options on the user interface 400 by placing a mouse pointer over an icon and clicking or double-clicking on that icon to select it. However it should also be appreciated that in other embodiments, for example where a touchscreen is used, the user may directly touch the screen or display so as to select icons and enter information. A user may also use a hardware keyboard or the like attached to a PC or directly attached to a label printer for navigating about the user interface.

In the embodiment of FIG. 4 a user has clicked on home icon 402, and is accordingly presented with home screen 401. This presents the user with a number of label types which may be selected by clicking on their respective icon. These label types include a general label 404, a cable wrap label 406, a 110-block label 408, a patch panel label 410, a horizontal breaker label 412, an asset tracking label 414, a heat shrink label 416, an arc flash label 418, a quick label 420, a flag label 422, a distribution panel label 424, a terminal block label 426, a vertical breaker label 428, a pipe marking label 430, a self-laminating cable wrap label 432, and a right-to-know label 434. It should be appreciated that further label types may also be displayed on the home screen 401.

The heat shrink label 416, arc flash label 418, self-laminating cable wrap label 432, and right-to-know label 434 are each displayed with an exclamation mark adjacent their icon. This informs the user that these label types are not available in the given context. For example it may not be possible to print these label types on the selected type of label material. The selected type of label material is shown at portion 436 of the user interface 400.

The above label types may be presented to a user when they click on the "new label" icon 438. In the embodiment of FIG. 4 the "new label" screen also doubles as the home screen.

Further options are also available via user interface 400. These include an "open label" icon 439. By clicking on this icon the user can open a previously saved label. By clicking on "file management" icon 440 the user enters a further interface where the user can manage their saved files, such as renaming the file and transferring files to and from a label printer. The user can also access a settings menu via icon 442 for changing settings of the user interface. For example the user can change the language setting and whether to use imperial or metric units.

By clicking on icon 444 the user is presented with a drop down list of label printers. The type of label printer selected may for example determine the types of label that are available to a user and/or formatting options available.

Icon 446 is "print" icon which enables a user to print a currently displayed label by clicking on that icon.

If a user is already in the process of preparing a label, and has exited the label editing screen for any reason, then they can quickly return to editing that label by clicking on "continue editing" icon 448.

Figure 5:
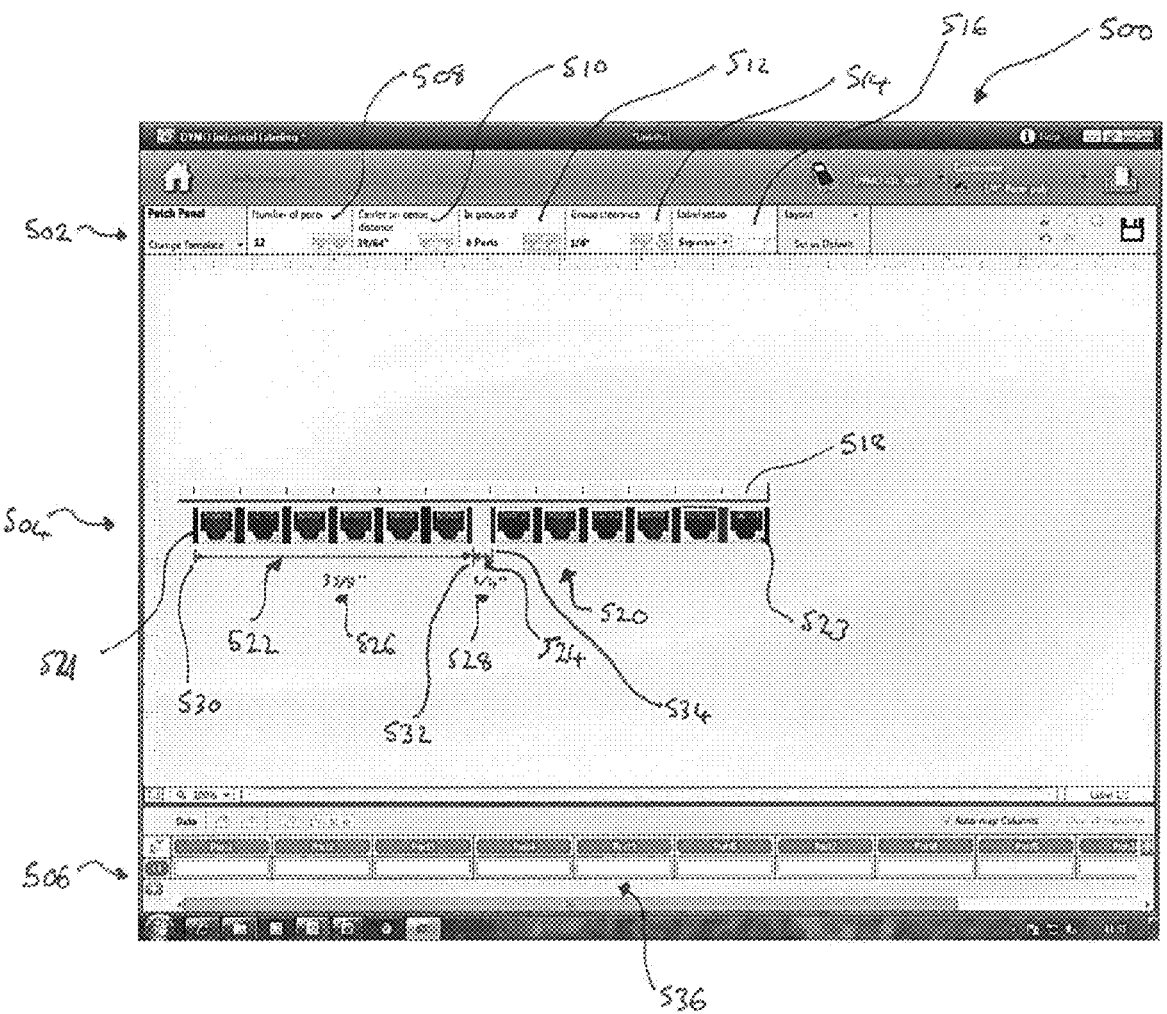
FIG. 5 shows a user interface according to an embodiment.

FIG. 5 shows a user interface 500 associated with the preparation of a patch panel label. This screen may have been reached by selecting patch panel icon 410 (see FIG. 4). The patch panel user interface 500 comprises three general regions: an options or toolbar region 502; a label preview region 504; and a data entry region 506.

In the toolbar region 502 a user can modify aspects of the label and/or object to which the label is to be applied. In the embodiments of FIG. 5 the user is preparing a patch panel label, and therefore the options relate to the patch panel and/or the associated label. For example as shown at 508 the user can change the number of ports of the patch panel. In this example the number of ports has been set to 12. This number can be adjusted by the user in any known way. For example if the user hovers a mouse pointer over the "number of ports" option 508, then up and down arrows may appear which enable a user to increment or decrease the number of ports. In region 510 the user can adjust the centre on centre distance between ports of the patch panel. As shown at 512 the user can adjust the number of ports per group. In this example the user has selected six ports per group. As shown at 514 the user is also presented with an option for adjusting the group clearance i.e. the distance between groups of ports. In this example the user has set the group clearance at a quarter of an inch. As shown at 516 the user has an option for adjusting the label setup. This provides the user with a drop down menu enabling the user to choose between separate and continuous labels. With "separate" labels there is a separate label per patch panel group. With "continuous" labels there is provided a single label to cover all of the patch panel groups. In this example the user has selected separate labels for each patch panel group.

Label preview region 504 displays an image of the label to be printed 518, and an image of the object 520. In this case the object is a patch panel 520. The properties of the patch panel 520 match the properties entered in the toolbar 502 e.g. the patch panel comprises 12 ports with 6 ports in each group.

Below the image of the patch panel 520 is a further image indicative of dimensions of the patch panel. This further image comprises double headed arrow 522 and double headed arrow 524. Arrow 522 is indicative of the length of the first group of ports of the patch panel 520. The patch panel 520 comprises a first group of ports 521, and a second group of ports 523. The arrow 522 is representative of the length of the first group of ports 521. The value of this length is shown adjacent the label at 526. In this example the overall length of the first group of ports is displayed to be 3 and ⅝ of an inch. The distance between the port groups 521 and 523 is displayed at 528 i.e. adjacent arrow 524. In this example the distance between the groups is a quarter of an inch, which matches the group clearance set at 514. It will be appreciated that the means for indicating the dimensions of the patch panel can take other forms, and that the use of arrows is one example only. For example a bar or a line with no arrowheads could be used. It will also be appreciated that the arrows or other means can be used for representing or indicating any dimension of the object 520 or label 518. For example the dimension could be a length, width, depth, corner to corner dimension etc.

In the embodiment of FIG. 5 the arrows comprise vertical lines 530, 532 and 534 at the ends thereof. This clearly demarcates the ends of the dimension that the arrows refer to.

Data input region 506 enables a user to enter information into data grid 536. Data in the data grid 536 can either be automatically mapped to the label 518, or dragged and dropped into the label 518. Alternatively the user can directly enter data into label 518 by clicking on the label 518 and then entering the necessary data.

Figure 6:
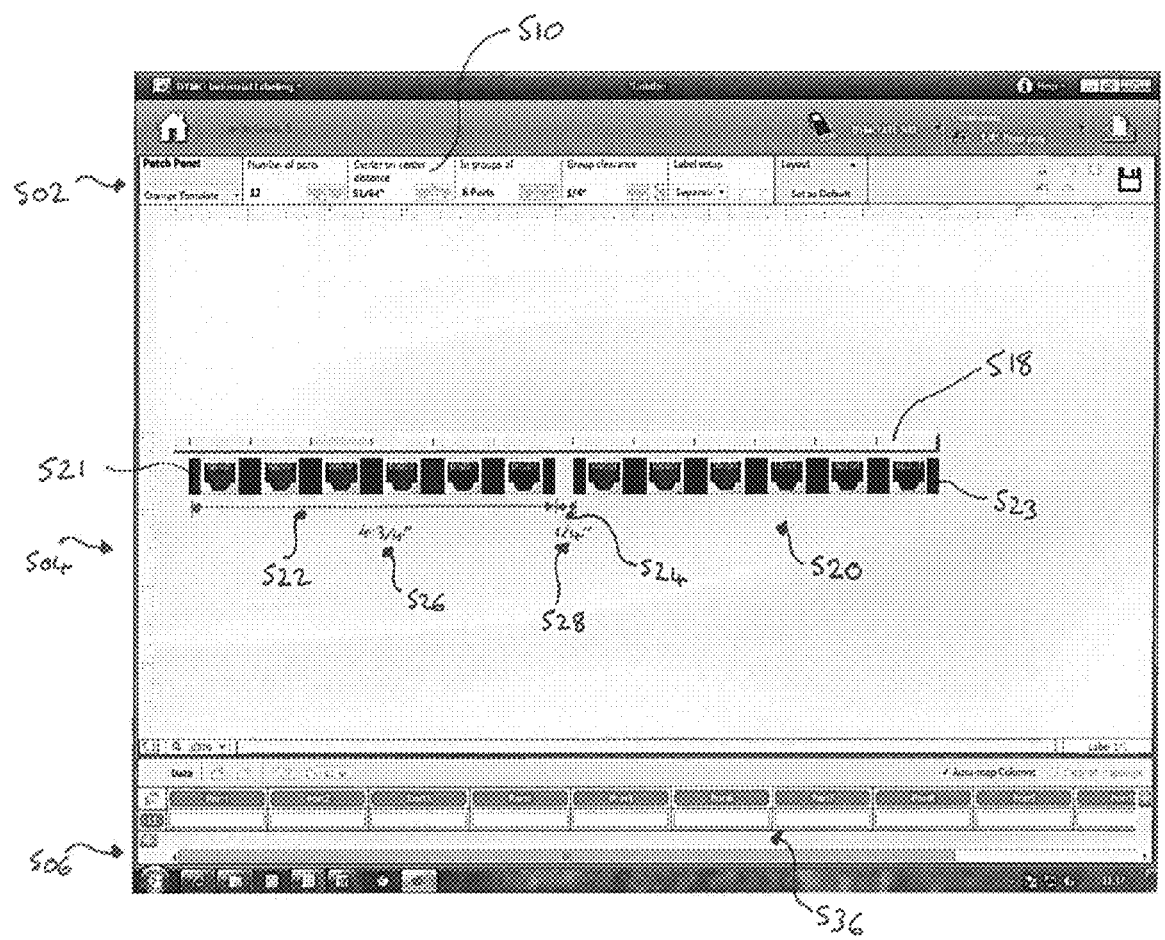
FIG. 6 shows a progression of the user interface of FIG. 5.

A user can modify parameters of the label 518 and/or object 520, as shown in FIG. 6. One way of changing the parameters is in the toolbar region 502, as previously discussed. A user can also change dimensions of the label 518 and/or object 520 by changing the lengths of the arrows 522 and 524. For example shortening arrow 522 will result in a corresponding shortening of the length of first port group 521. Likewise lengthening arrow 522 will result in a corresponding lengthening of first port group 521.

In one embodiment the arrow 522 can be lengthened and/or shortened by "grabbing" an end of the arrow with, for example, a mouse pointer, and then dragging and dropping the end of the arrow until the desired new length is reached. In the example of FIG. 6 the user has increased the length of arrow 522 which has resulted in a corresponding increase in the length of first port group 521. In this example the user has selected or "grabbed" the right hand most arrowhead of arrow 522 by clicking on or selecting in any other way the rightmost arrowhead, and then dragging the arrowhead to the desired length. As shown at 526 the length has increased to 4 and ¾ inches from the length of 3 and ⅝ inches as shown in FIG. 5. In some embodiments the length displayed adjacent the arrow at 526 dynamically updates (i.e. in real time) as the length of the arrow is changed. This way the user can easily see the change in length during the dragging operation. Increasing the overall length of the patch panel groups 521 and 523 also result in an increase in the centre on centre distance between the ports. This is shown at 510 where the centre on centre distance has increased from ³⁹⁄₆₄ inches in FIG. 5 to ⁵¹⁄₆₄ inches as shown in FIG. 6. This value 510 in the toolbar 502 may also dynamically update during the action of modifying the length of arrow 522. By "dynamically" is meant that the value changes in real time or simultaneously with the changing arrow length.

It should be understood that the "dragging and dropping" operation of changing the arrow length can be carried out a number of ways. For example the user may hold down a mouse button while the arrow length is being changed. In another embodiment the user may click a mouse button once to start the operation, and then click the mouse button again to end the operation. Where a touchscreen is used the user may select the end of the arrow with their finger and then drag their finger across the screen to change the arrow length, or alternatively touch the screen in a different position to select the new position for the end of the arrow.

Figure 7:
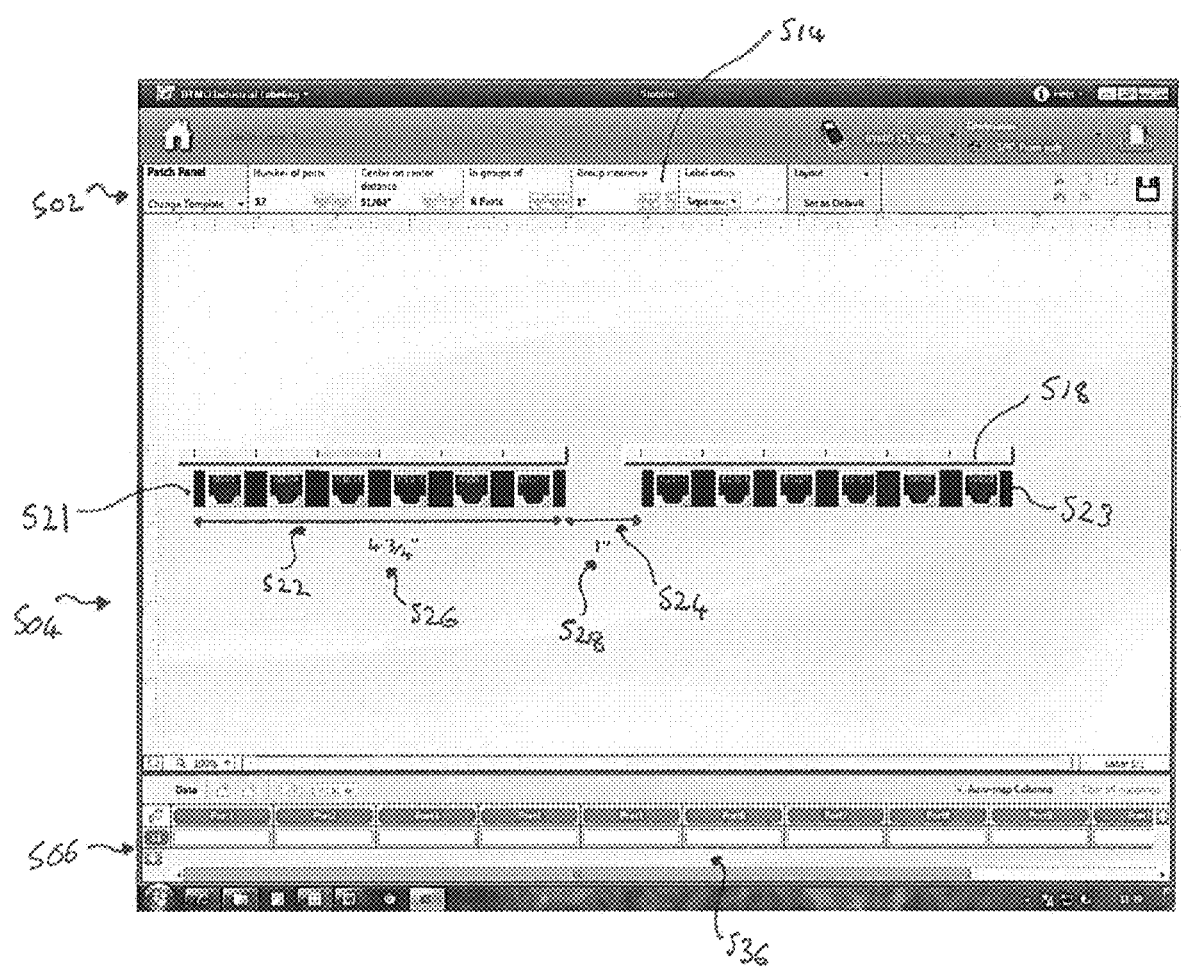
FIG. 7 shows a progression of the user interface of FIG. 6.

A user can also modify the distance between port groups 521 and 523 in a similar manner. As shown in FIG. 7 the arrow 524 has been lengthened, which has resulted in a corresponding lengthening between the port groups 521 and 523. The arrow maybe lengthened in the same or similar manner to the arrow 522 as described above. The value 528 has updated to show the increase of the group clearance from a quarter of an inch as shown in FIG. 6 to 1 inch as shown in FIG. 7. Again, the displayed value may change in real time or "dynamically" as the arrow is lengthened. The value 514 in toolbar 502 has also been updated to reflect the increase of the group clearance to 1 inch. This value in the toolbar may also change in real time as the arrow 524 is lengthened.

It will also be appreciated that adjusting the values in the toolbar region 502 may also result in real-time corresponding adjustment of the values in the preview region 504. Furthermore, it will be appreciated that adjustment of the length of the arrows 522 and 524 may result in real-time adjustment of the image of the label 518 and image of the object 521, and not just real-time adjustment of the displayed values.

Figure 8:
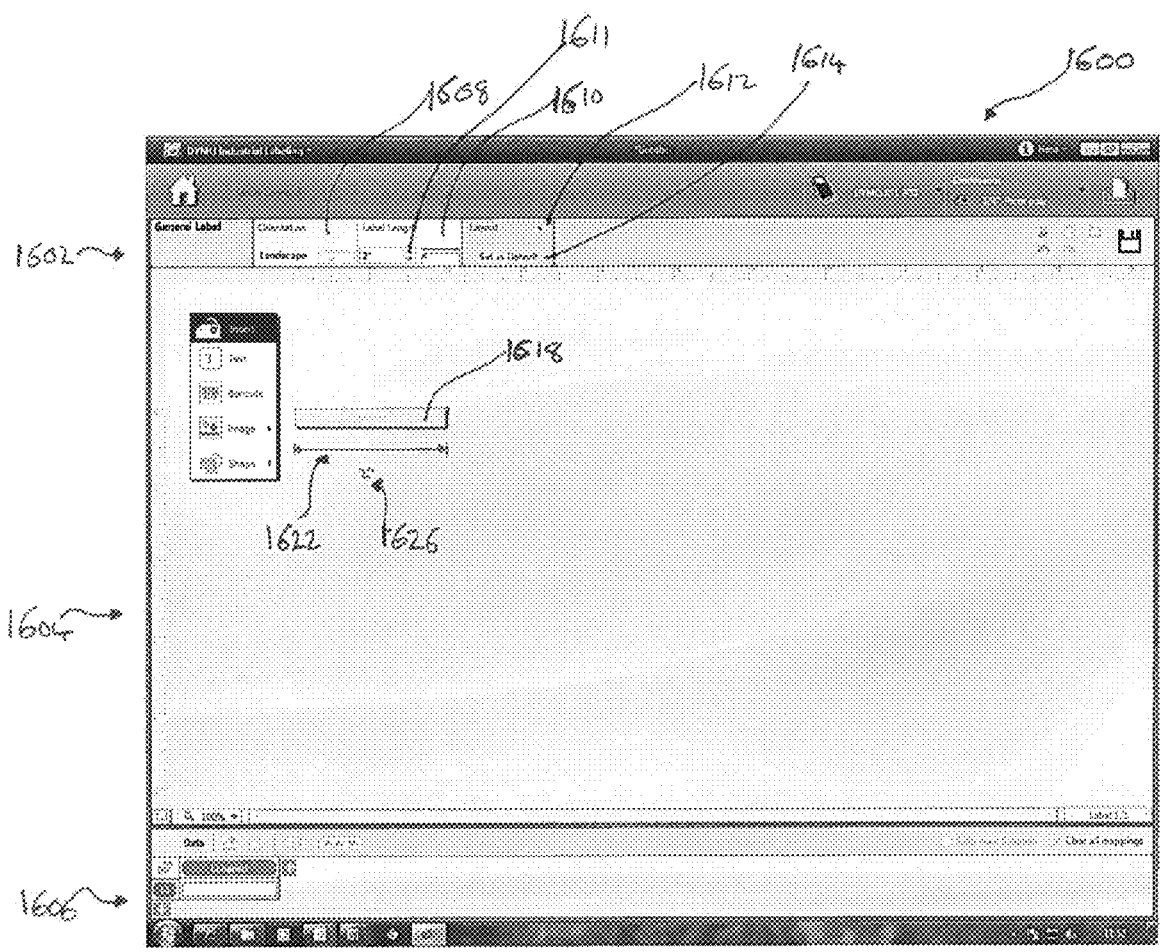
FIG. 8 shows a user interface according to a further embodiment.
Figure 9:
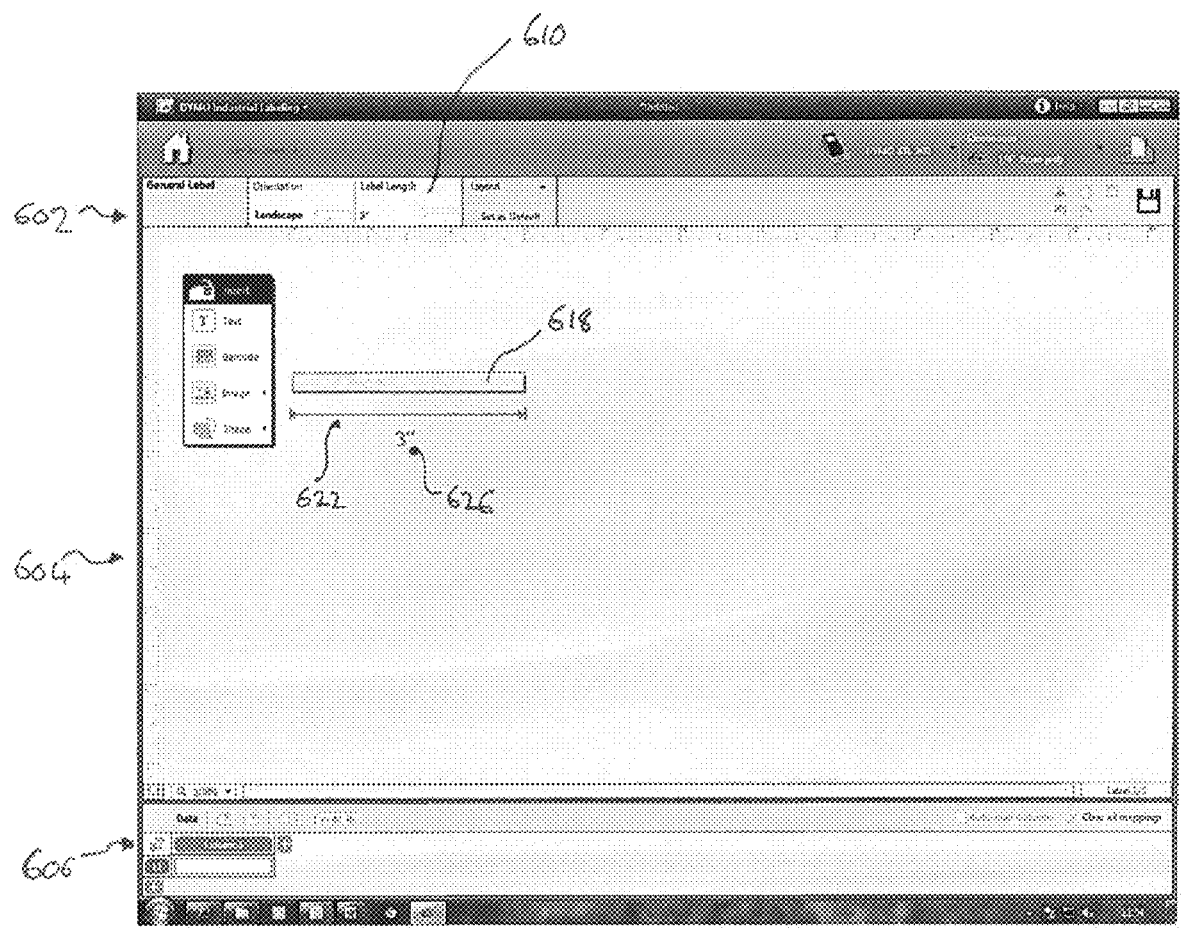
FIG. 9 shows a progression of the user interface of FIG. 8.

It will of course be appreciated that this principle can be extended to other label types, and is not limited to patch panel labels. FIGS. 8 and 9 show adjustment of a "general label". A general label can be prepared by first clicking or selecting general label icon 404 on user interface 400. The user is then presented with a user interface screen 1600 as shown for example in FIG. 8. User interface 1600 comprises a toolbar area 1602, a label preview area 1604, and a data input area 1606.

The toolbar region 1602 provides a user with a number of options. These include enabling a user to switch the orientation of the label between portrait and landscape mode. As shown at 1608, in this example the user has selected the landscape mode. As shown at 1610 the user can use the toolbar to change the label length by using "stepper" 1611. In option box 1612 the user can change some layout options of the label e.g. whether to provide borders on the label and whether to match trailer and leader lengths etc. The user can also click on "set as default" option 1614 to store the current settings as new default settings.

The label preview is shown at 1618, in label preview area 1604. At 1622 is shown an arrow adjacent the label 1618, the arrow 1622 be indicative of the length of label 1618. A numerical value of the length of label 1618 is shown at 1626. In the example of FIG. 8 the label length is 2 inches. This matches the label length shown at 1610 in the toolbar 1602.

The length of arrow 1622, and accordingly the length of label 1618, can be lengthened or shortened by adjusting the length of arrow 1622, in the same or similar manner to that discussed with respect to FIGS. 5 to 7. That is the user can select an end of the arrow 1622 and move it to a new position so as to set a new length. In FIG. 9 the user has increased the length of arrow 1622, and accordingly the length of label 1618 from 2 inches as shown in FIG. 8 to 3 inches as shown in FIG. 9. The image of the label 1618 may update in real time or "dynamically" as the length of the arrow 622 is adjusted. The label length displayed at 1610 is also updated in real time. It will also be appreciated that if the label length is changed in option box 1610 by a user, then the image of the label 1618 and the image of the arrow 1622 is updated in real time or "dynamically" in the label preview area 1604.

It will be appreciated that in FIGS. 5 to 9 the lengthening of an arrow and a corresponding lengthening of an associated image of an object or label has been discussed. It will of course be appreciated that the same principle may also be applied to the shortening of an arrow image and associated shortening of a label and/or object image.

Some embodiments may enhance user friendliness since the user can at any time in a label or object modification procedure see the current length of the dimension being modified. Providing the update in real time is useful to a user as it enables them to make adjustments in a one step process. Furthermore by providing the arrow (or other suitable image) adjacent to the label or object being modified, then there is no need to select the image of the label or object itself to carry out the modification. This means that a user does not have to obscure the image of the label or object during the modification procedure with a pointer or the like. This enhances the user experience since it improves the view of the label and/or object.

A method for creating a patch panel label has been discussed in relation to FIGS. 5 to 7, and a method for creating a general label has been discussed with respect to FIGS. 8 and 9. In each of these examples the options available to a user (e.g. label and/or object parameters) are displayed on the user interface simultaneously, for example in a toolbar region 502 and 1602. The user can adjust options available in the toolbar in any order that they so wish.

FIGS. 10 to 13 show an alternative method for preparing a patch panel label. It should however be noted that this is by way of example only, and that the principles can apply to the preparation of any other label type e.g. the types of labels shown in FIG. 4. FIGS. 10 to 13 shown a series of screens used to guide a user through a patch panel label creation process in a linear step-by-step fashion. In other words FIGS. 10 to 13 show a label creation "wizard".

Figure 10:
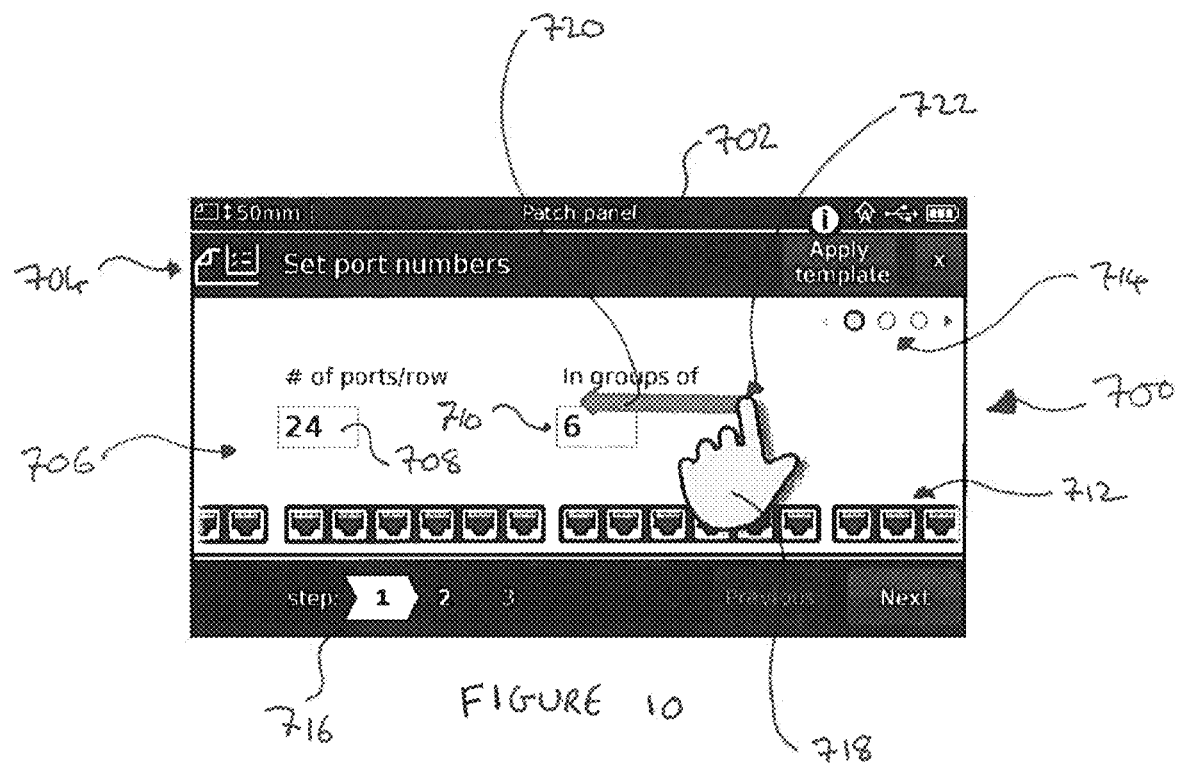
FIG. 10 shows a user interface according to a further embodiment.

FIG. 10 shows a first screen 700 of the label creation wizard. A bar 702 at the top of the screen displays to a user that they are in a patch panel mode. A second bar 704 displays to a user information that requires entry, in this case "set port numbers". In some embodiments default values are provided which a user can then adjust. In an edit region 706 the user can enter required information. In this case, in box 708 the user can enter the number of ports per row. In this case the user has selected 24. In box 710 the user can specify how many ports are to be contained in each group, and in this case the user has set a value of 6. A preview of the patch panel according to the entered information is shown at 712.

An indicator is provided at 714 for indicating to a user how far through the label creation process they are. In FIG. 10 it is shown at 714 by the highlighted circle that the user is at step 1 of 3. This information is also displayed at region 716 of display.

An image of a user's hand is displayed at 718. In some embodiments this is an actual icon on the user interface which a user can move by means of a mouse or tracker pad or other similar means. However for the purposes of this example the "wizard" is displayed on a touch screen, and the image of the hand 718 is illustrative of a user's hand (or stylus or other means), and is not actually displayed on the screen. The arrow 720 is indicative of a direction of movement of the user's hand, and is not actually displayed on the wizard screen. As will be described with respect to the further figures a user can navigate through the wizard screens by means of contacting the touchscreen and moving the position of their hand on the touchscreen. In FIG. 10 it may be considered that the user has initially contacted the screen at position 722.

Figure 11:
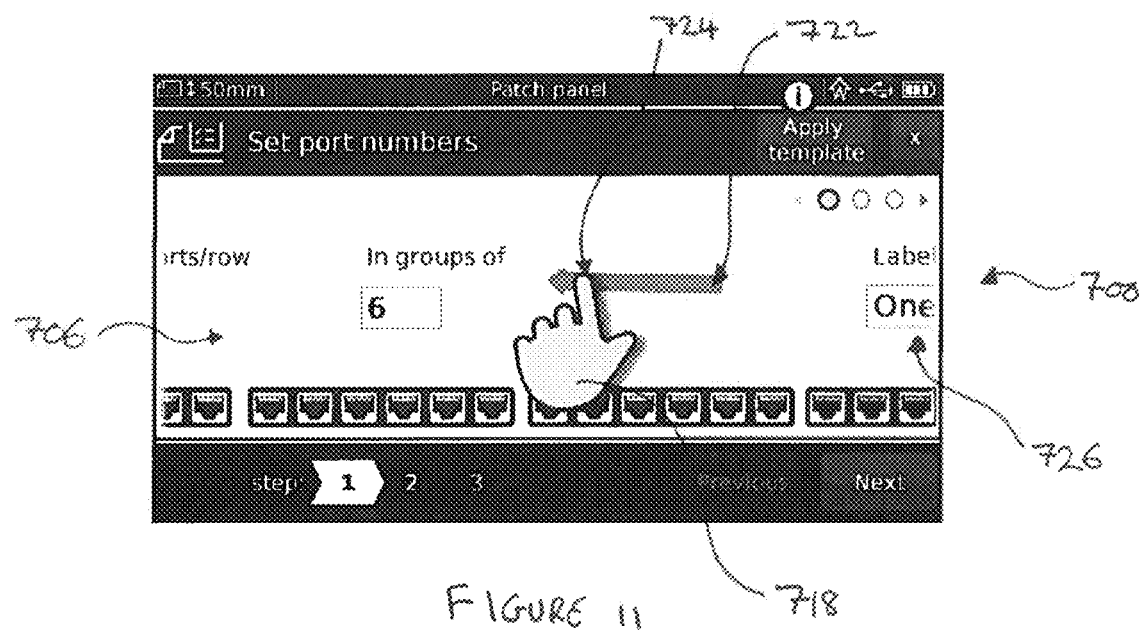
FIG. 11 shows a progression of the user interface of FIG. 10.

In a next step, as shown in FIG. 11, the user drags their finger from position 722 to position 724. This action of moving the user's finger from right to left on the screen causes a corresponding movement from right to left of the information displayed on the screen. That is the box 708 shown in FIG. 10 has now moved to the left to an extent that it is no longer displayed on the screen 700, and as shown in region 726 at the far right of the screen, the next step of the wizard is beginning to appear on the screen 700.

Figure 12:
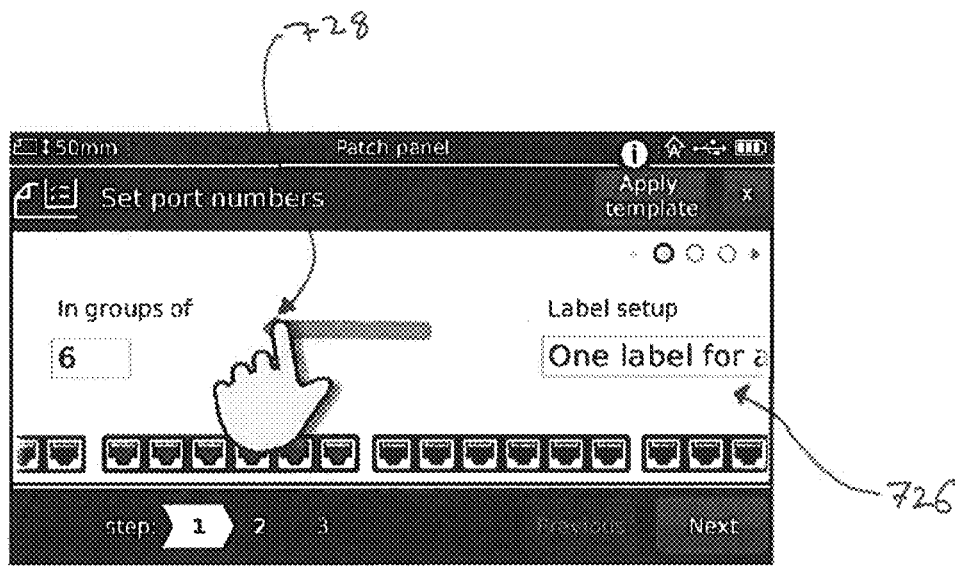
FIG. 12 shows a progression of the user interface of FIG. 11.

As shown in FIG. 12 the user continues to move their finger from right to left to a third position 728 and a larger proportion of the subsequent step of the label creation wizard has become visible in region 726.

Figure 13:
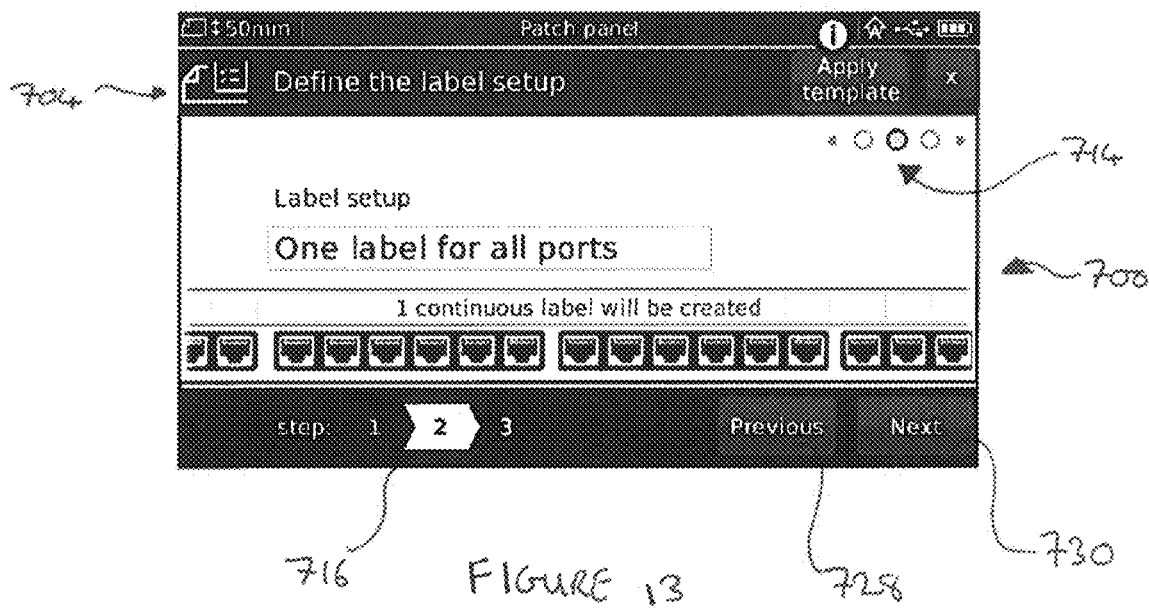
FIG. 13 shows a progression of the user interface of FIG. 12.

As shown in FIG. 13 the user then releases their finger from the touchscreen and the wizard has progressed to the next step. Indicators 714 and 716 now show that the user is at step 2 of 3 of the label creation wizard. Region 704 now shows that the user needs to define the label set up. For example the use may choose one label for all ports or separate labels for different groups of ports.

The user can also navigate through the wizard screens using "previous" and "next" buttons 728 and 730.

Whilst FIGS. 10 to 13 have shown a user proceeding to a subsequent wizard screen by dragging their finger or "swiping" from right to left on the screen, it will of course be appreciated that a user can return to a previous screen by the reverse operation i.e. swiping from left to right. These directions can also be changed. For example a user may swipe from left to right to move to a subsequent screen, and swipe from right to left to return to a previous screen. Movement of the user's finger or stylus on the screen vertically may also be used to move between screens.

In the described embodiment the user touches the screen in a first position and then maintains contact with the screen while moving their finger to a second position to progress or move back between wizard screens. In another embodiment a user does not have to maintain contact with the screen i.e. the user can simply touch the screen at a first position and then touch the screen at a second position (without maintaining contact with the screen between these two positions) so as to move between wizard steps. In some embodiments the next or previous wizard screen is not displayed until the user has released their contact from the screen.

The principle described with respect to FIGS. 10 to 13 can also be applied to moving between other types of screen, and is not limited to a label creation wizard.

The described embodiments enable a user to move between screens in a user friendly and instinctive way. Accordingly it may speed up the label creation process.

In some embodiments when a user lets go of the screen or deselects the selector then the user interface updates to display one full wizard screen. If the user interface shows partial amounts of two wizard screens and the user releases contact, the screen which is subsequently displayed may be dependent upon the proportion of each screen displayed at the time the user removed contact from the screen. For example in FIG. 11 if the user were to let go of the screen the user interface would revert to that shown in FIG. 10, since only a minority of the subsequent screen is shown at region 726. Likewise when the user lets go of the screen at FIG. 12 the user interface proceeds to display the second step of the wizard, since a majority of that screen was displayed at the time the user releases contact from the screen.

Figure 14:
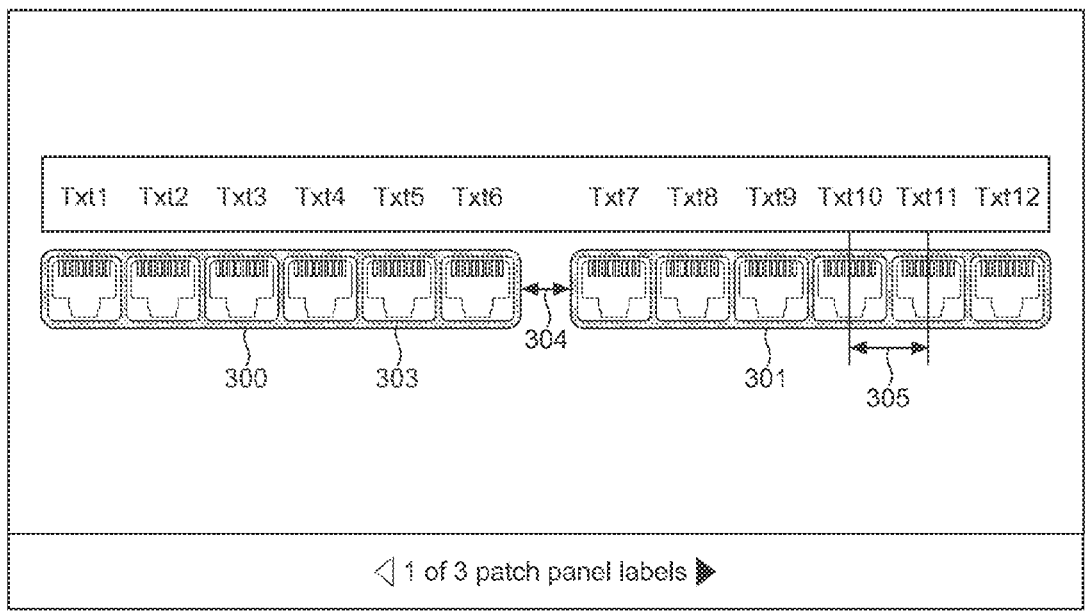
FIG. 14 shows a user interface according to a further embodiment.

Some embodiments may also provide an improved method for navigating between labels and/or errors, as shown in FIGS. 14 to 18. For example FIG. 14 shows a user interface 800 for creating a label. The user interface comprises an information area 802 giving the user information about a current process. For example the information area in FIG. 14 shows that the user is currently in the process of navigating labels. At region 808 of information area 802 the user is provided with information regarding which label of a series of labels they are currently viewing. In the example of FIG. 14 the user is provided with information that they are preparing the first label of a series of five labels.

Label preview area 804 provides a preview of a label to be printed 810. In this case, since the user is creating a patch panel label, a preview of the patch panel 812 is also provided.

In an options area 806 at the bottom of the user interface the user can select between options. In the example of FIG. 14 the user can use "radio" buttons 814 and 816 to respectively navigate between labels and errors. In this example the user has currently selected to navigate between labels. Accordingly a label navigator "pop-up" or tool 818 is displayed on the user interface 800. The label navigator tool 818 overlays a label preview area showing the label and object side by side in such a way that the label is visible and the object is still partly visible. The human mind, upon viewing the label preview area, will interpret the label preview area in such a way as if the overlaying window is not present. Thus, by providing the information in the described way, more information can be provided to a user on a limited display size.

The label navigator tool 818 comprises a first region 820 which informs a user which label they are currently viewing (label number 1 in this case). A numerical stepper 822 is also provided. The numerical stepper 822 comprises a minus (−) button 824 and a plus (+) button 826. The user can navigate through labels using the numerical stepper 822 by selecting either the minus icon 824 or the plus icon 826. As shown in FIG. 15 the user has selected plus icon 826 and accordingly the label number in region 820 and in region 808 has updated to show that the label now being displayed is label 811 which is the second label in a series of five.

This concept can also be extended to the display of "errors" to a user. Errors may accidentally be created by a user during the label creation process, and these errors may be detected by the label creation program. As shown in FIG. 16 the user has selected "errors" radio button 816. In response to this a pop-up or error navigation tool 828 is displayed on the user interface. The error navigation tool 828 comprises a first region 830 which displays to a user which error number they are viewing. In this example the user is viewing error number 1. The error navigation tool 828 also comprises a numerical stepper 832 comprising minus icon 834 and plus icon 836 which enables a user to navigate through the errors.

The first error is present in the first label. Accordingly region 808 of the display informs the user that the error is on the first label of a series of five labels. The error is present in region 838 of label 810. The region 838 is highlighted by means of a box 840 and a warning sign 842 comprising an exclamation mark to clearly display where in the label 810 the error is present. It will of course be appreciated that other ways of showing the error may be used e.g. by use of different colours, shading, a flashing background etc. A warning sign 846 is also present in region 844 of the display. However this is not the currently selected error and therefore it is not highlighted by means of a box, as per region 838.

In FIG. 17 the user has selected plus icon 836 which has advanced the counter to show the second error. Accordingly region 844 is highlighted with a box to show that this is the location of the second error. This error is also contained within the first label, as indicated by region 808.

Figure 18:
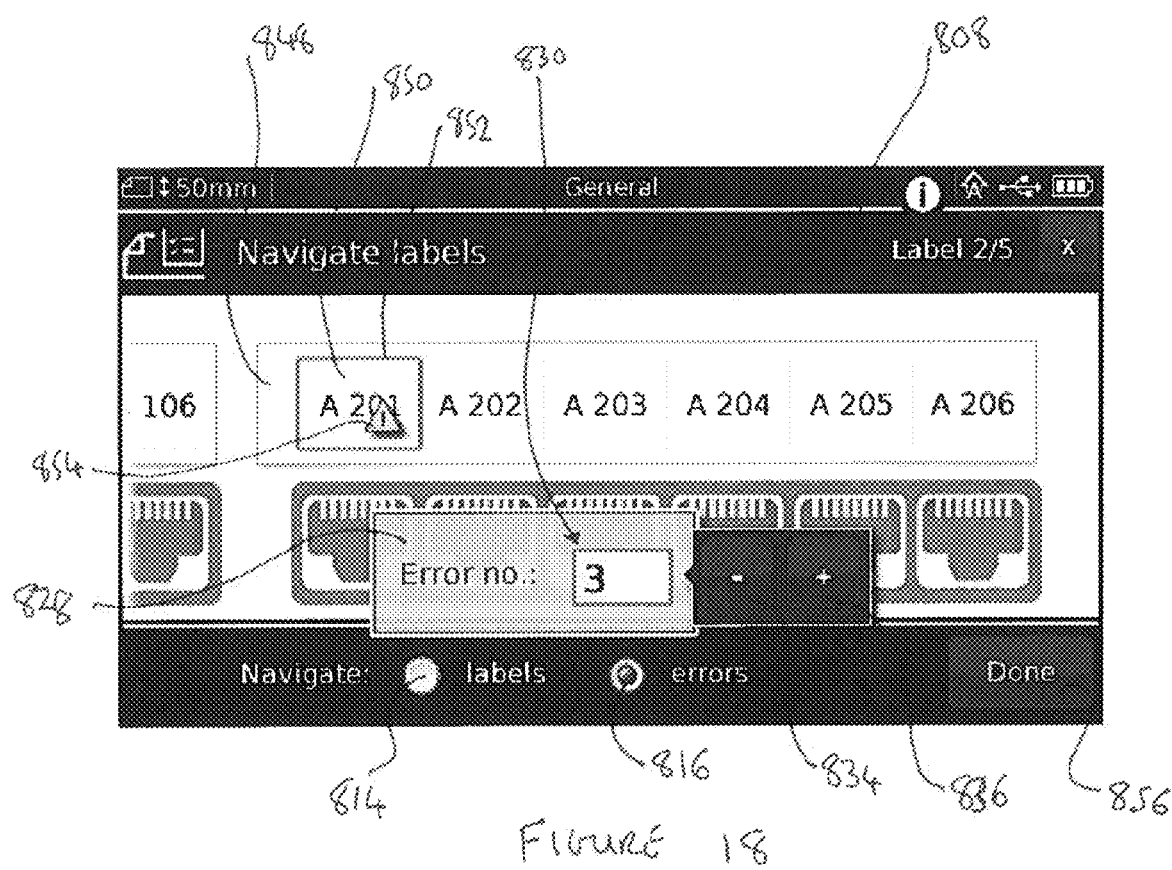
FIG. 18 shows a progression of the user interface of FIG. 17.

In FIG. 18 the user has selected plus icon 836 again so as to navigate to the third error. This error is present in region 850 of second label 848. This region is accordingly highlighted with a box 852 and displays a warning in the form of an exclamation mark 854.

Since the error is present in the second label 848, then region 808 has updated to indicate this. Once the user has dealt with all errors, then the user can click the "done" button 856.

Figure 19:
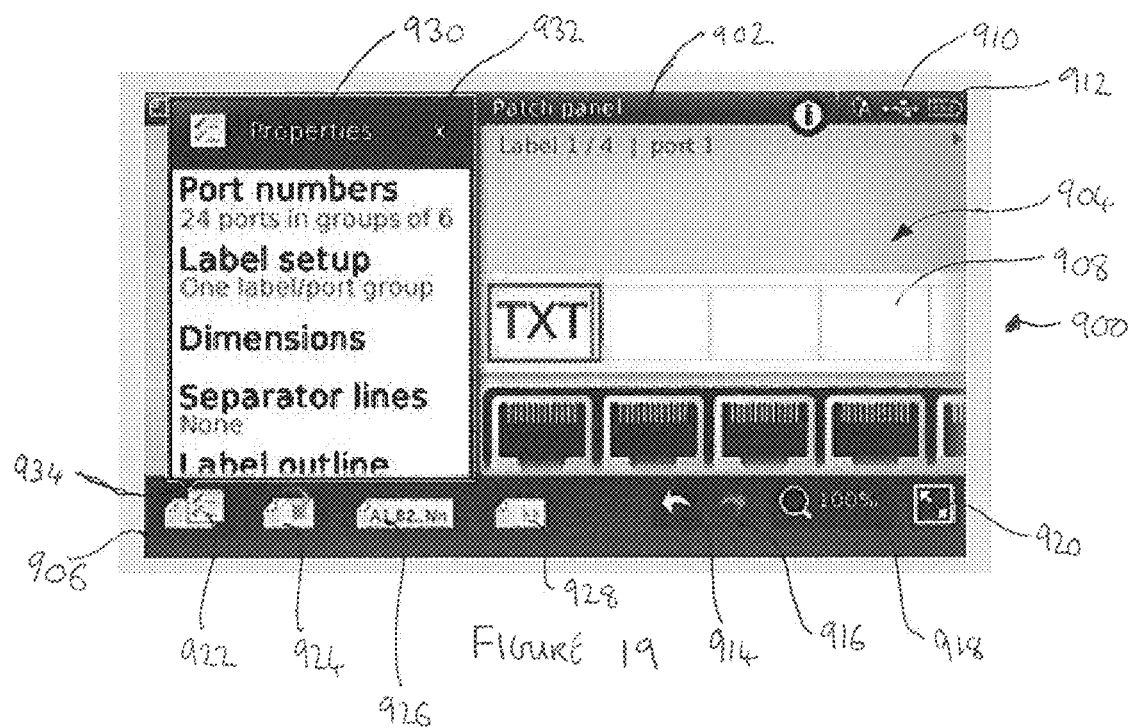
FIG. 19 shows a user interface according to a further embodiment.
Figure 20:
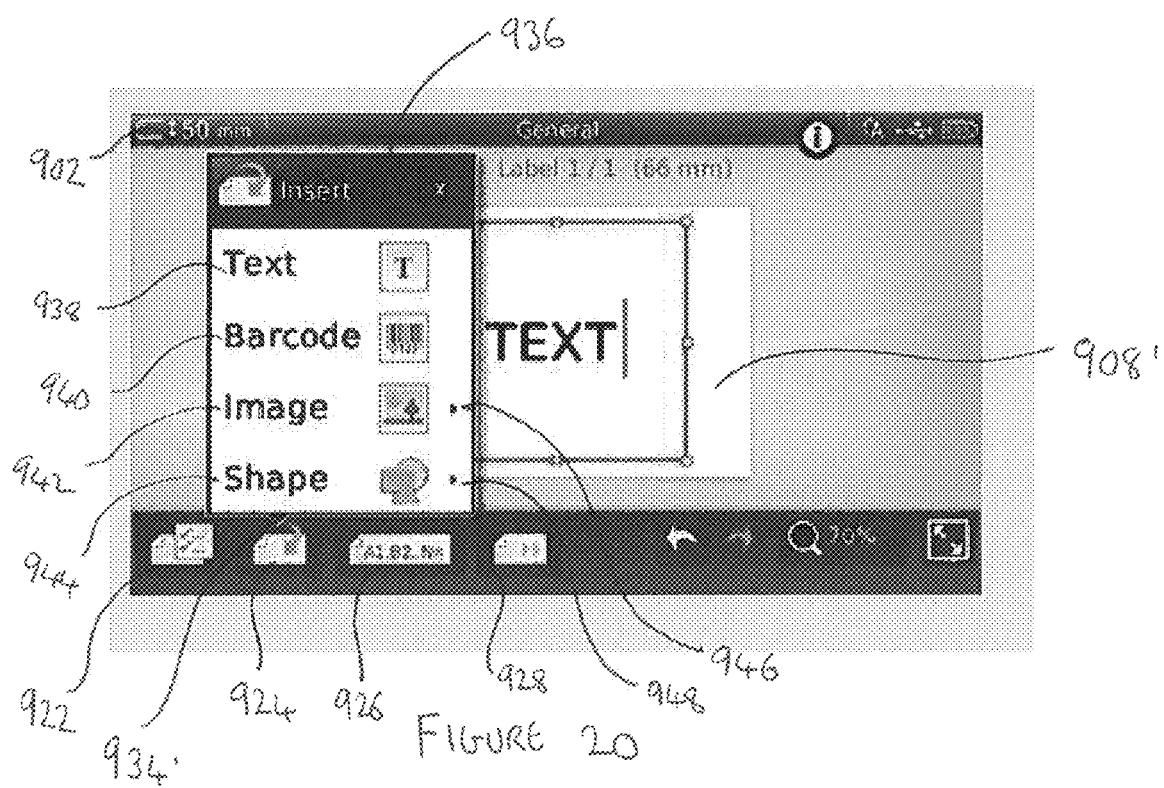
FIG. 20 is a progression of the user interface of FIG. 19.
Figure 1:
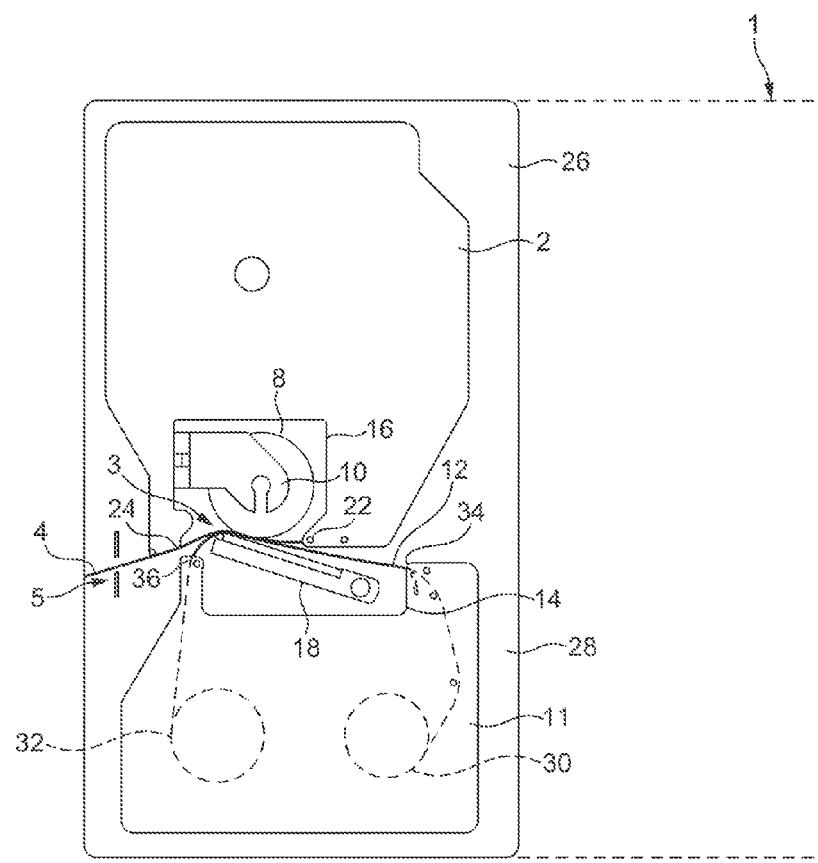
Figure 2:
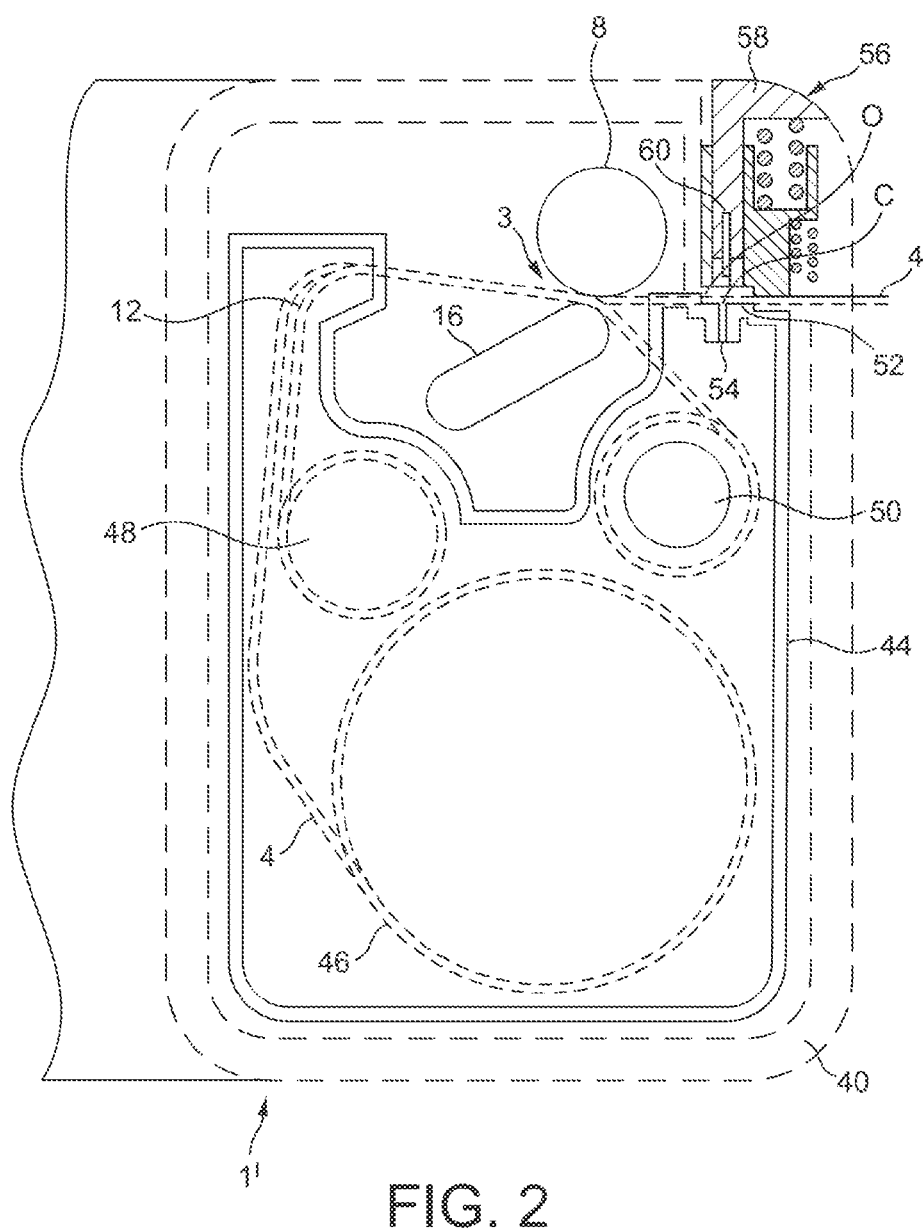
Figure 3:
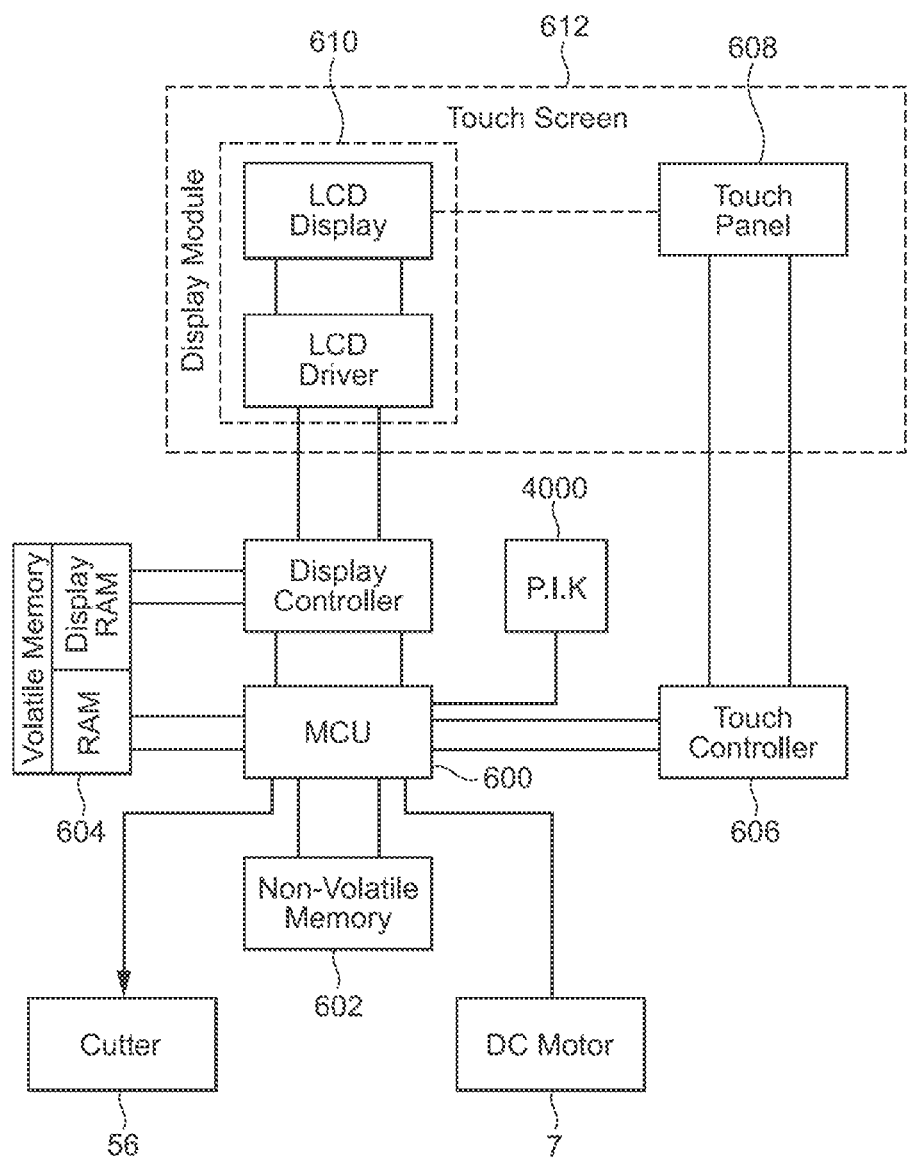
Figure 4:
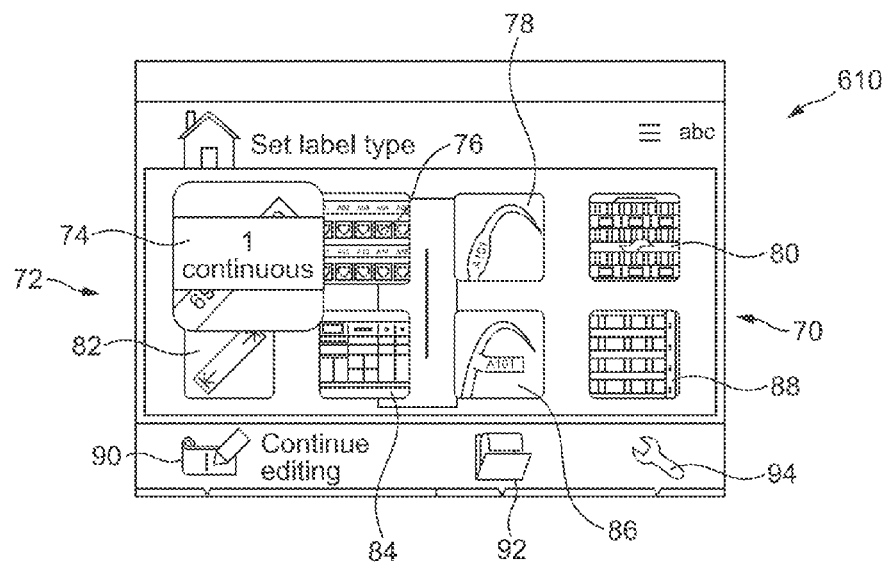
Figure 5:
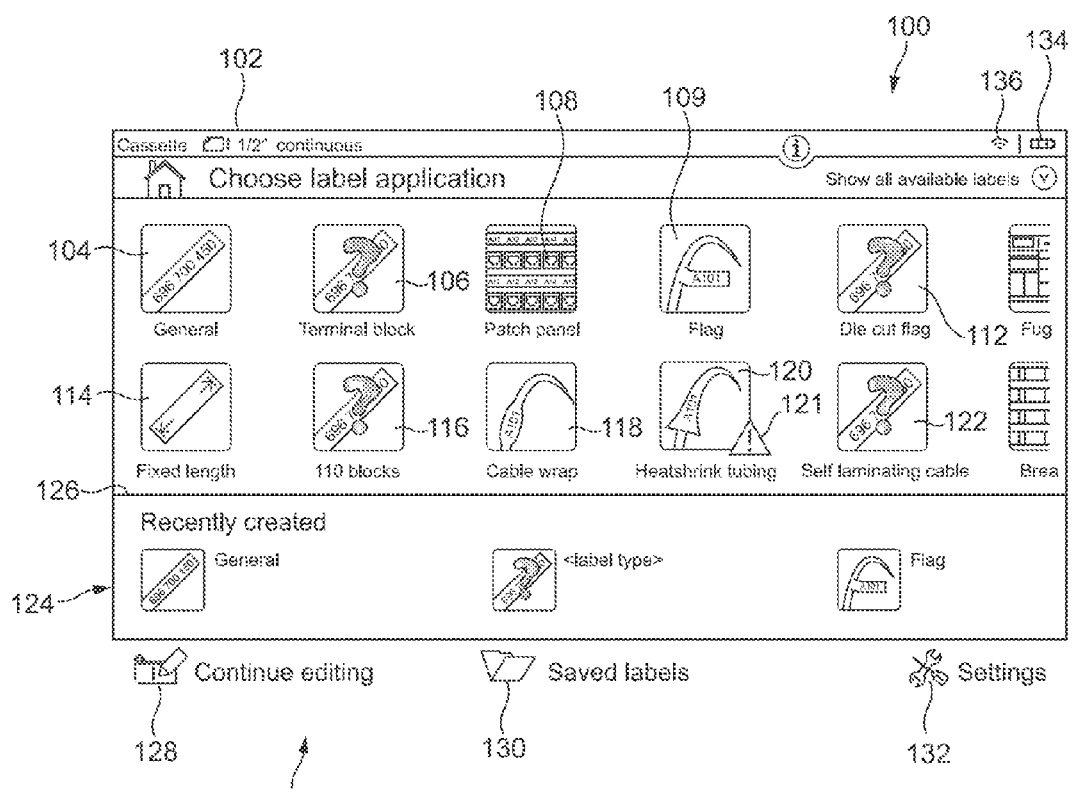
Figure 6:
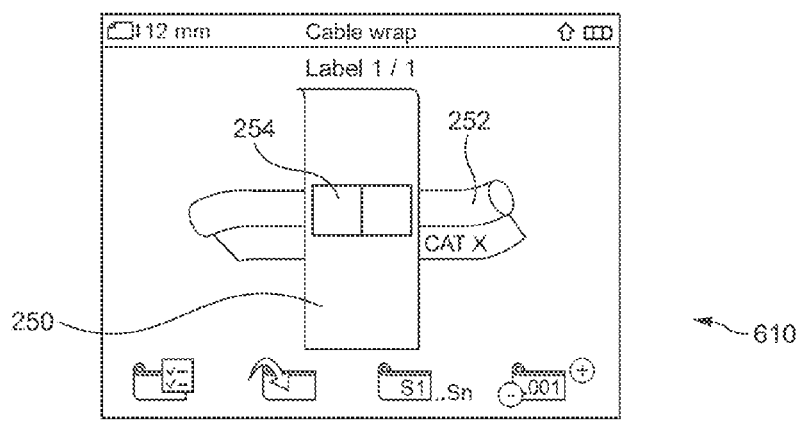
Figure 7:
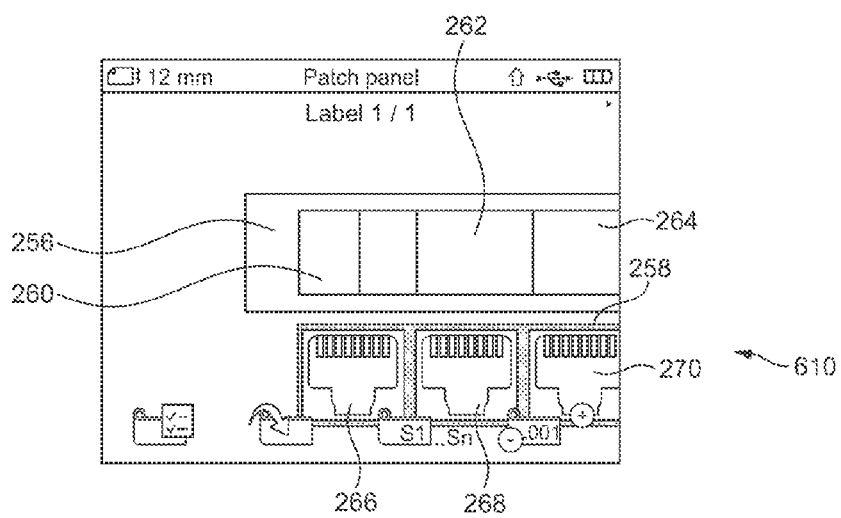
Figure 8:
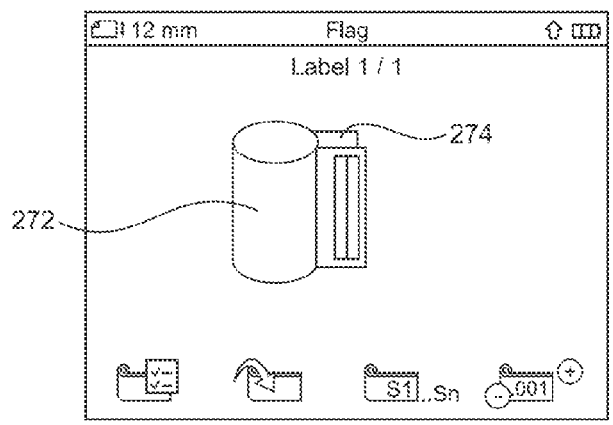
Figure 9:
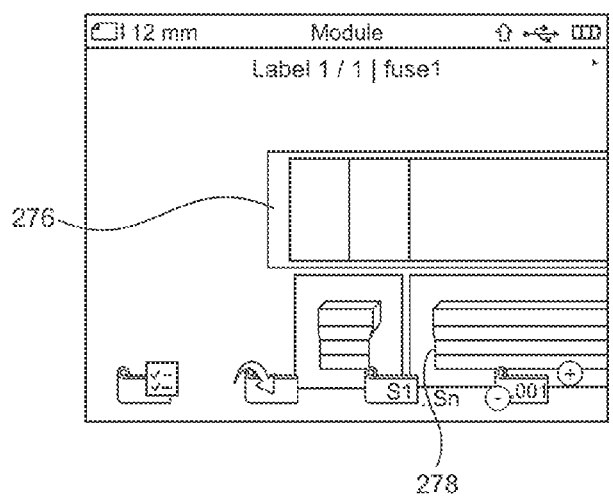
Figure 10:
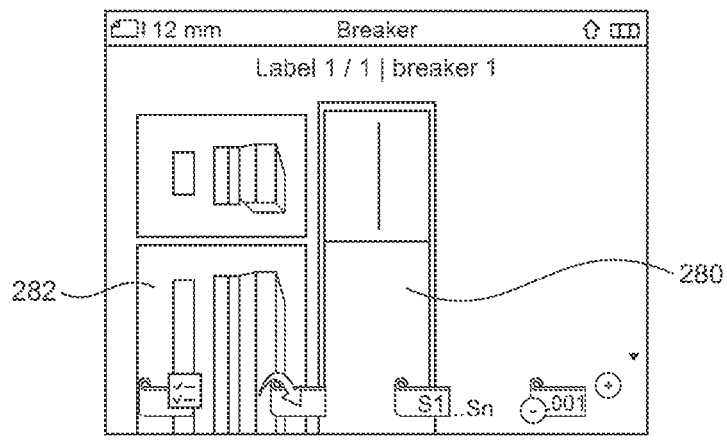
Figure 11:
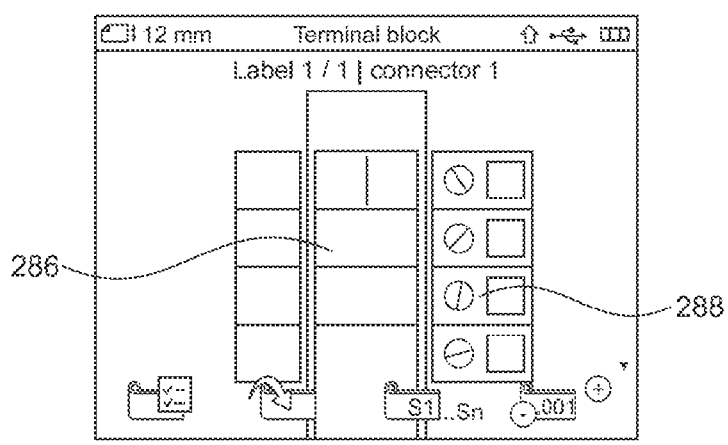
Figure 12:
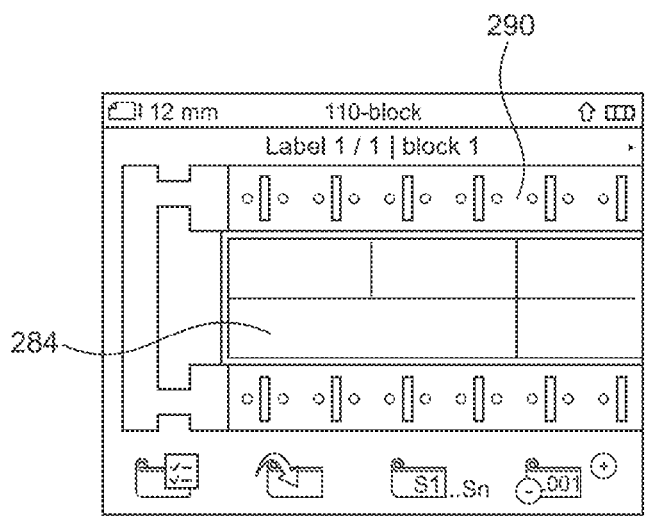
Figure 13:
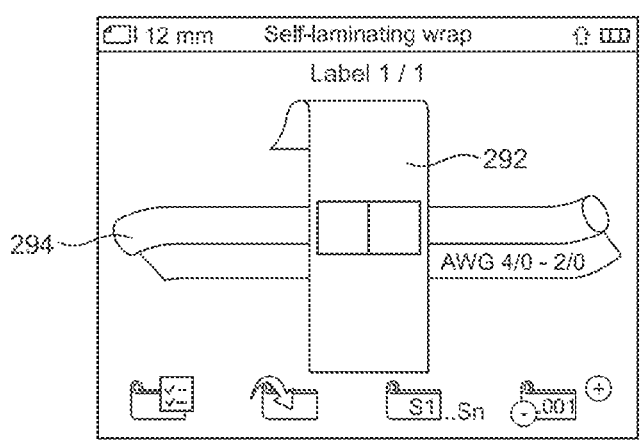

Another feature provided in some embodiments are menu "pop-ups" or "overlays" as shown in FIGS. 19 and 20. FIG. 19 shows a user interface 900 for a label creation process. The user interface 900 comprises an information area 902, a label preview area 904, and an options region or toolbar 906. The information area 902 informs the user that they are in a patch panel mode. The label preview area 904 comprises a preview of a label 908. The information area 902 also informs the user that the label printer is connected to a PC with symbol 910, and symbol 912 shows a current battery charge level of the label printer.

The toolbar area 906 comprises an "undo" function 914 which allows a user to undo a previous action, and a "redo" function 916 which enables the user to redo an action which has been previously undone. The magnifying glass icon 918 enables a user to zoom in and out of the label preview. A maximise function 920 enables a user to maximise the user interface so as to fill a display.

Toolbar 906 also comprises selectable icons 922, 924, 926 and 928.

Icon 922 is a "properties" icon which enables a user to change properties of the label being created. Icon 924 is an "insert" icon that provides a user with options that may be inserted into a label. Icon 926 provides a user with a serialization function, and icon 928 provides a user with options for enabling a user to navigate between multiple labels.

In FIG. 19 the user has selected icon 922 causing a "properties" menu 930 to appear which pops up and partially overlays the label image 908. In this case a user is creating a patch panel label and therefore the properties available to the user are related to a patch panel label e.g. port numbers, label set up (number of labels per group), dimensions of the patch panel, and whether to show separator lines. The properties menu 930 comprises a "close" button 932 in the form of an "x" and an indicator (in this case arrow 934) which points at properties icon 922 to display that the menu 930 is associated with that icon.

In FIG. 20 the user is in a general label mode, as indicated in information area 902. In FIG. 20 the user has selected icon 924 which has opened up a new "insert" menu 936. The insert menu 936 again partially overlays the label image 908'. The insert menu gives the user options relating to items that can be inserted into the label, such as text 938, barcode 940, an image 942, or a shape 944. The image 942 and shape 944 options each comprise arrows 946 and 948 respectively associated therewith. If a user selects either of these arrows 946 or 948 then a further options menu appears to the right of menu 936, again overlaying or partially overlaying label preview 908'. The further options menu will provide for example a selection of images or shapes that can be inserted into the label. The arrow 934' now points at "insert" icon 924, to display that the displayed menu 936 is associated with this icon.

These pop-ups or overlays help a user to efficiently create a label. Overlaying the label image as opposed to taking a user to an entirely new menu screen may speed up the label creation process and may also enables a user to more quickly select between separate options. For example if the user has properties menu 930 open and instead wants to select the insert menu 924, then all the user has to do is select insert icon 924. The user does not have to exit the previously opened properties menu before doing this. Accordingly a label can be created more quickly. Additionally, by maintaining at least some of the label image in the display then the user may remain aware of the label context as they navigate the displayed options. Furthermore, many items may be displayed in the pop-ups simultaneously which may reduce the amount of navigation required for a user.

The skilled person would appreciate that any of the methods described herein may be implemented using a computer program embodied on a computer readable medium (such as a CDROM or memory within a stand-alone printer) for controlling a controller (or other similar apparatus as discussed above).

Embodiments may be used with continuous tape or die cut labels. Die cut labels are provided on a continuous backing layer but are discrete, pre-cut labels. The tape or die cut labels may be provided in a cassette or simply on a roll.

The foregoing merely illustrates the principles of certain embodiments. Modifications and alterations to the described embodiments will be apparent to those skilled in the art in view of the teaching herein. It will thus be appreciated that those skilled in the art would be able to devise numerous techniques which although not explicitly described herein, embody the principles of the described embodiments and are thus within the scope defined by the claims.

ASPECTS OF THE DISCLOSURE

Aspect 20. A method comprising:
providing, on a display, a user interface for a label printer;
displaying on said user interface a first screen associated with a label creation process;

and in response to selecting, with a selector, a first position on said display and moving said selector to a second position on said display, displaying on said user interface a second screen associated with said label creation process, wherein said second screen is different from said first screen.

Aspect 21. A method as set forth in claim 20, wherein said selector comprises a user-controlled pointer on said display.

Aspect 22. A method as set forth in claim 20, wherein said display comprises a touch-screen, and said selector comprises one of a user's finger and a stylus.

Aspect 23. A method as set forth in any of claims 20 to 22, wherein said second point is vertically disposed from said first point.

Aspect 24. A method as set forth in any of claims 20 to 23, wherein said second point is horizontally disposed from said first point.

Aspect 25. A method as set forth in any of claims 20 to 24, wherein a content of the second screen displayed on said user interface is dependent on a direction in which said selector is moved on said display.

Aspect 26. A method as set forth in any of claims 20 to 25, wherein in response to the selector being moved from right to left on said display, said user interface advances to a subsequent step of the label creation process.

Aspect 27. A method as set forth in any of claims 20 to 25, wherein in response to the selector being moved from left to right on said display, said user interface moves to a previous step of the label creation process.

Aspect 28. A method as set forth in any of claims 20 to 27, wherein said label creation process comprises a label creation wizard.

Aspect 29. A method as set forth in any of claims 20 to 28, wherein said user interface comprises an indicator for indicating to a user their progress in the label creation process.

Aspect 30. A method as set forth in claim 29, wherein said indicator automatically updates in response to moving from said first screen to said second screen.

Aspect 31. A computer program comprising computer program code means adapted to perform the method according to any of claims 20 to 30 when said program is run on a computer.

Aspect 32. An apparatus comprising a controller configured:

to output, to a display driver, data for causing the display driver to drive a display to display a user interface for a label printer;

and to display on said user interface a first screen associated with a label creation process;

and in response to detecting selection of a first position on said display by a selector and movement of said selector to a second position on said display, said controller configured to cause said display to display on said user interface a second screen associated with said label creation process, wherein said second screen is different from said first screen.

Aspect 33. An apparatus as set forth in claim 32, wherein said selector comprises a user-controlled pointer on said display.

Aspect 34. An apparatus as set forth in claim 32, wherein said display comprises a touch-screen, and said selector comprises one of a user's finger and a stylus.

Aspect 35. An apparatus as set forth in any of claims 32 to 34, wherein said second point is vertically disposed from said first point.

Aspect 36. An apparatus as set forth in any of claims 32 to 35, wherein said second point is horizontally disposed from said first point.

Aspect 37. An apparatus as set forth in any of claims 32 to 36, wherein a content of the second screen displayed on said user interface is dependent on a direction in which said selector is moved on said display.

Aspect 38. An apparatus as set forth in any of claims 32 to 37, wherein in response to detecting movement of the selector from right to left on said display, said controller is configured to cause the user interface to advance to a subsequent step of the label creation process.

Aspect 39. An apparatus as set forth in any of claims 32 to 37, wherein in response to detecting movement of the selector from left to right on said display, said user interface moves to a previous step of the label creation process.

Aspect 40. An apparatus as set forth in any of claims 32 to 39, wherein said label creation process comprises a label creation wizard.

Aspect 41. An apparatus as set forth in any of claims 32 to 40, wherein said controller is configured to cause the user interface to display an indicator for indicating to a user their progress in the label creation process.

Aspect 42. An apparatus as set forth in claim 41, wherein said controller is configured to cause the indicator to automatically update in response to movement from said first screen to said second screen.

Aspect 43. A method comprising:

displaying on a user interface an error-counter associated with a number of errors in a label creation process;

enabling a user to cycle through each error of the error-counter;

wherein an error associated with a displayed error number of the error counter is displayed in a preview region of the user interface.

Aspect 44. A method as set forth in claim 43, wherein a visual indicator is displayed adjacent to the displayed error.

Aspect 45. A method as set forth in claim 43 or claim 44, wherein an image of an object or label containing the error is centred in the preview region.

Aspect 46. A method as set forth in any of claims 43 to 45, wherein a label number indicator is provided informing a user which label of a series of labels said displayed error is associated with.

Aspect 47. A method as set forth in any of claims 43 to 46, wherein the error counter comprises a pop-up window which at least partially overlays said preview region.

Aspect 48. A method as set forth in any of claims 43 to 47, wherein the error counter comprises at least one associated icon which, when activated by a user, causes the count of the error counter to increase.

Aspect 49. A method as set forth in any of claims 43 to 48, wherein the error counter comprises at least one associated icon which, when activated by a user, causes the count of the error counter to decrease.

Aspect 50. A computer program comprising computer program code means adapted to perform the method according to any of claims 43 to 49 when said program is run on a computer.

Aspect 51. An apparatus comprising a controller configured:

to output, to a display driver, data for causing the display driver to drive a display to display on a user interface an error-counter associated with a number of errors in a label creation process;

said controller configured to enable a user to cycle through each error of the error-counter;

and wherein said controller is configured to cause an error associated with a displayed error number of the error counter to be displayed in a preview region of the user interface.

Aspect 52. An apparatus as set forth in claim 51, wherein the controller is configured to cause a visual indicator to be displayed adjacent to the displayed error.

Aspect 53. An apparatus as set forth in claim 51 or claim 52, wherein the controller is configured to cause an image of an object or label containing the error to be centred in the preview region.

Aspect 54. An apparatus as set forth in any of claims 51 to 53, wherein the controller is configured to cause a label number indicator to be displayed informing a user which label of a series of labels said displayed error is associated with.

Aspect 55. An apparatus as set forth in any of claims 51 to 54, wherein the error counter comprises a pop-up window which at least partially overlays said preview region.

Aspect 56. An apparatus as set forth in any of claims 51 to 55, wherein the error counter comprises at least one associated icon, and wherein in response to activation of said icon by a user, the controller is configured to cause the count of the error counter to increase.

Aspect 57. An apparatus as set forth in any of claims 51 to 56, wherein the error counter comprises at least one associated icon, and wherein in response to activation of said icon by a user, the controller is configured to cause the count of the error counter to decrease.

Aspect 58. A method comprising:
controlling a label printer user interface to display, in a first region, a preview of a label to be printed;
and to display, in a second region, at least one icon associated with a plurality of options for creating a label;
and wherein, following selection of said at least one icon by a user, said plurality of options are displayed to said user, such that said displayed plurality of options at least partially overlays said first region.

Aspect 59. A method as set forth in claim 58, wherein said first region further displays an image of an object associated with said label to be printed.

Aspect 60. A method as set forth in claim 58 or claim 59, wherein a size of said first region remains constant.

Aspect 61. A method as set forth in any of claims 58 to 60, wherein said plurality of options are displayed as a list.

Aspect 62. A method as set forth in any of claims 58 to 60, wherein said plurality of options are displayed as a menu.

Aspect 63. A method as set forth in any of claims 58 to 63, wherein said displayed plurality of options does not overlay said second region.

Aspect 64. A method as set forth in any of claims 58 to 63, wherein said displayed plurality of options comprises an indicator pointing to said selected icon.

Aspect 65. A method as set forth in any of claims 58 to 64, wherein a plurality of icons are displayed in said second region, and following selection of a second icon a plurality of options associated with said second icon are displayed.

Aspect 66. A method as set forth in claim 65, wherein in response to selection of said second icon, said indicator points to said second icon.

Aspect 67. A computer program comprising computer program code means adapted to perform the method according to any of claims 58 to 66 when said program is run on a computer.

Aspect 68. An apparatus comprising a controller configured:
to output, to a display driver, data for causing the display driver to drive a display to display in a first region of a user interface a preview of a label to be printed;
and to display, in a second region, at least one icon associated with a plurality of options for creating a label;
and wherein, following selection of said at least one icon by a user, said controller is configured to cause said plurality of options to be displayed to said user, such that said displayed plurality of options at least partially overlays said first region.

Aspect 69. An apparatus as set forth in claim 68, wherein said controller is further configured to cause an image of an object associated with said label to be printed to be displayed in said first region.

Aspect 70. An apparatus as set forth in claim 68 or claim 69, wherein said controller is configured to cause a size of said first region to remain constant.

Aspect 71. An apparatus as set forth in any of claims 68 to 70, wherein said controller is configured to cause said plurality of options to be displayed as a list.

Aspect 72. An apparatus as set forth in any of claims 68 to 70, wherein said controller is configured to cause said plurality of options to be displayed as a menu.

Aspect 73. An apparatus as set forth in any of claims 68 to 72, wherein said controller is configured to display said plurality of options such that said plurality of options does not overlay said second region.

Aspect 74. An apparatus as set forth in any of claims 68 to 73, wherein said controller is configured to provide said displayed plurality of options with an indicator pointing to said selected icon.

Aspect 75. An apparatus as set forth in any of claims 68 to 74, wherein said controller is configured to cause a plurality of icons to be displayed in said second region, and following selection of a second icon a said controller is configured to cause a plurality of options associated with said second icon to be displayed.

Aspect 76. An apparatus as set forth in claim 75, wherein in response to selection of said second icon, said controller is configured to cause said indicator to point to said second icon.

Appendix

LABEL PRINTING APPARATUS

The present invention relates to a label printer for printing an image onto a label. In particular but not exclusively, some embodiments relate to a user interface of such a label printer.

Known label printing apparatuses are disclosed in EP-A-322918 and EP-A-322919 (Brother Kogyo Kabushiki Kaisha) and EP-A-267890 (Varitronic). The label printing apparatuses each include a cassette receiving bay for receiving a cassette or tape holding case. In EP-A-267890, the tape holding case houses an ink ribbon and a substrate tape, the latter comprising an upper image receiving layer secured to a backing layer by an adhesive. In EP-A-322918 and EP-A-322919, the tape holding case houses an ink ribbon, a transparent image receiving tape and a double sided adhesive tape which is secured at one of its adhesive coated sides to the image tape after printing and which has a backing layer peelable from its other adhesive coated side. With both these apparatus, the image transfer medium (ink ribbon) and the image receiving tape (substrate) are in the same cassette.

It has also been proposed by the present applicants in, for example, EP-A-578372 to house the ink ribbon and the substrate tape in separate cassettes.

In all of these cases, the image receiving tape passes in overlap with the ink ribbon to a print zone consisting of a fixed print head and a platen against which the print head can be pressed to cause an image to transfer from the ink ribbon to the image receiving tape. There are many ways of doing this, including dry lettering or dry film impression, but the most usual way currently is by thermal printing where the print head is heated and the heat causes ink from the ink ribbon to be transferred to the image receiving tape.

In other known tape printing apparatuses, so-called direct thermal tapes are used, in which an image is created directly onto the direct thermal tape without the interposition of an ink ribbon cassette. Elements of a print head are heated, and the heat causes chemicals within the direct thermal tape to react and produce an image in or on the tape.

The apparatuses of the type described above are provided with a keyboard which enables a user to enter characters, symbols and the like to form an image to be printed by the tape printer. The keyboard usually has text character keys and number keys for entering letters and numbers respectively, plus some function keys which, among other things, operate menus and allow printing attributes to be set.

"Stand-alone" label printers can be distinguished from "label printer systems", which comprise a printer connected to a PC or other computing device. In such label printer systems, a user creates or edits a label for printing using a PC, and then sends print data to a printer to cause the printer to print the print data onto a label medium. In such label printer systems, the user will view a display of the PC to create a label, rather than a display of the printer. Also, the label-editing software used for creating the label will be stored and run on the PC, rather than the printer.

In contrast, stand-alone label printers are operable independently of a PC or other computer to create and print a label. Although some stand-alone printers are connectable to a PC or other computer to receive some data, they are nevertheless operable independently of the PC or other computer to create a label for printing, since label-editing software used for creating the label is stored and run on the label printer itself. Stand-alone label printers thus usually include an integral display via which the user can view an interface of the label-editing software.

According to one aspect there is provided a method of creating a label to be printed by a label printing apparatus comprising: providing a user, on a display, with at least one option relating to a type of object to which the label to be printed is to be applied; and following selection of said at least one option displaying on said display an image of the label to be printed and an image of the object to which the label to be printed is to be applied.

The method may comprise displaying said image of the label adjacent to said image of the object to which the label is to be applied.

The method may comprise displaying said image of the label in a manner representative of how the label will appear when applied to the object.

The type of object may be selectable from a memory.

The type of object may comprise one of: a cable; a wire; a patch-panel; a terminal-block; a fuse-box; a 110-block; a module; a breaker block; a distribution panel.

The type of object may be captured as a photograph.

The parameters of said object may be adjustable.

The parameters of said label to be printed may be adjustable.

The adjustments to said parameters of said object may cause an update of the image of said object and/or the image of the label.

The adjustments to said label to be printed may cause an update of the image of the label and/or the image of the object.

The updates of said images may be displayed in real-time.

The label printing apparatus may be a stand-alone label printing apparatus.

The label-printing apparatus may be connectable to an external apparatus.

In another aspect there is provided a method of creating a label to be printed on a label printing apparatus comprising: determining at least one option relating to a label-creating process to be made available to a user, said determining at least one option dependent upon a type of image receiving medium in said label printing apparatus; displaying said at least one option on a display; and enabling a user to select said at least one option; and following selection of said at least one option determining at least one further option relating to the label-creating process to be made available to the user; and modifying said display to display said at least one further option.

In another aspect there is provided an apparatus comprising: means for providing a user, on a display, with at least one option relating to a type of object to which the label to be printed is to be applied; and means for displaying on said display, following selection of said at least one option, an image of the label to be printed and an image of the object to which the label to be printed is to be applied.

In another aspect there is provided an apparatus comprising: at least one processor; and at least one memory; the at least one processor and the at least one memory arranged to cause the apparatus at least to provide a user, on a display, with at least one option relating to a type of object to which the label to be printed is to be applied; and arranged to display, following selection of said at least one option, an image of the label to be printed and an image of the object to which the label to be printed is to be applied on said display.

In another aspect there is provided an apparatus comprising: means for determining at least one option relating to a label-creating process to be made available to a user, said determining at least one option dependent upon a type of image receiving medium in said label printing apparatus; means for displaying said at least one option on a display; means for enabling a user to select said at least one option; wherein said apparatus is arranged to, following selection of said at least one option, determine at least one further option relating to the label-creating process to be made available to the user; and is arranged to modify said display to display said at least one further option.

In another aspect there is provided an apparatus comprising: at least one processor; and at least one memory; the at least one processor and the at least one memory arranged to cause the apparatus at least to determine at least one option relating to a label-creating process to be made available to a user, dependent upon a type of image receiving medium in said label printing apparatus; and display said at least one option on a display; and enable a user to select said at least one option; and following selection of said at least one option said apparatus is arranged to determine at least one further option relating to the label-creating process to be made available to the user; and modify said display to display said at least one further option.

In another aspect there is provided a computer program comprising computer program code means adapted to perform the above defined method when said program is run on a computer.

For a better understanding, and to show how embodiments may be carried into effect, reference will now be made by way of example only, to the accompanying figures in which:

Figure 1 shows certain features of one embodiment of a tape printing apparatus.

Figure 2 shows certain features of another embodiment of a tape printing apparatus.

Figure 3 schematically shows circuitry of an embodiment of a label printing apparatus.

Figure 4 shows an embodiment of a label printer user interface.

Figure 5 shows another embodiment of a label printer user interface.

Figures 6 to 13 each show a preview of a label to be created in relation to various respective objects, according to an embodiment;

Figure 14 shows a visualization of a patch panel and associated label where the patch panel has two groups.

Figure 1 shows in plan view a first label printer which has two cassettes arranged therein. Typically, this label printer 1 is powered by batteries at least part of the time. Alternatively the label printer may be mains powered.

The upper cassette is located in a first cassette receiving portion 26 and contains a supply of image receiving tape 4 which passes through a print zone 3 of the label printer 1 to an outlet 5 of the label printer 1. The image receiving tape 4 comprises an upper layer for receiving a printed image on its upper surface and has its other surface coated with an adhesive layer to which is secured a releasable backing layer. The upper cassette 2 has a recess for accommodating a platen 8 of the label printer 1, and guide portions 22 and 24 for guiding the tape through a print zone 3. The platen 8 is mounted for rotation within a cage moulding 10. Alternatively the platen could be mounted for rotation on a pin.

The lower cassette 11 is located in the second cassette receiving portion 28 and contains a thermal transfer ribbon 12 which extends from the supply spool 30 to a take-up spool 32 within the cassette 11. The thermal transfer ribbon 12 extends through the print zone 3 in overlap with the image receiving tape 4. The cassette 11 has a recess 14 for receiving a print head 18 of the label printer 1 and guide portions 34 and 36 for guiding the thermal transfer ribbon 12 through the print zone 3. Print head 18 is moveable between an operative position shown in Figure 1, in which it is in contact with the platen 8 and holds the thermal transfer ribbon 12 and the image receiving tape 4 in overlap between a print head 18 and the platen 8 in an inoperative position in which it is moved away from the platen 8 to release thermal transfer ribbon 12 and image receiving tape 4. In the operative position, the platen 8 is rotated to cause the image receiving tape 12 to be driven past print head 18 and the print head 18 is controlled to print an image on the image receiving tape 4 by thermal transfer of ink from the ribbon 12. Each of the printing elements on the print head 18 is activatable separately and is activated in accordance with the desired image to be printed. The label printer 1 has a lid (which is not shown) which is hinged along the rear of the cassette receiving portions 26 and 28 and which covers both cassettes when in place.

A DC motor 7 (see Figure 3) continuously drives the platen 8. The platen is arranged to drive the image receiving tape 4 through the print zone 3 by the actuation of its own rotation. In other embodiments, transport of the image receiving tape across the print head can be done by other means, such as by a separate driven roller of the printer or of the cassette, or by a pair of cooperating rollers positioned on opposite sides of the tape, or by other means.

The image is printed by the print head 18 on the image receiving tape on a column by column basis with the columns being adjacent one another in the direction of movement of the tape 4.

Figure 2 illustrates in plan view a cassette bay of a second label printer 1' which uses a one cassette system. Like reference numerals are used for those parts which are also shown in Figure 1. The cassette bay is shown by the dotted line 40. The cassette bay 40 includes a thermal print head 18 and a platen 8 which cooperate to define a print zone 3.

The print head 18 is pivotable about a pivot point so that it can be brought into contact with the platen 8 for printing and moved away from the platen 8 to enable the cassette to be removed and replaced as in the first embodiment. Alternatively the platen is pivotable so that it can be brought into contact with the printhead for printing and moved away from the printhead to enable the cassette to be inserted. A cassette inserted into the cassette bay 40 is denoted generally by reference numeral 44. The cassette 44 holds a supply spool 46 of image receiving tape 4. The image receiving tape 4 is guided by a guide mechanism (which is not shown) through the cassette 44, past the print zone 3 and out of the cassette 44 through an outlet O to a cutting location C. The same cassette 44 also has an ink ribbon supply spool 48 and an ink ribbon take up spool 50. The ink ribbon 12 is guided from the ink ribbon supply spool 48 through the print zone 3 and taken up on the ink ribbon take up spool 50. As with the first embodiment, the image receiving tape 4 passes in overlap with the ink ribbon 12 through the print zone 3 with its image receiving layer in contact with the ink ribbon 12. The platen of this second embodiment is also driven by a motor 7. The motor rotates to drive continuously the image receiving tape through the print zone 3 during printing. In either of the embodiments, it is possible that the tape be driven in a step wise manner by a stepper motor.

An image is printed on the tape fed out from the print zone to the cutting location C which is provided at a location in a portion of the wall of the cassette 44 which is close to the print zone 3. The portion of the wall on the cassette 44 where the cutting location C is defined is denoted by reference 52. A slot 54 is defined in the wall portion 52 and the image receiving tape 4 is fed past the print zone 3 and out of the cassette 44 through an outlet O to the cutting location C where it is supported by facing wall portions on either side of the slot 54.

The second label printing device 1' includes a cutting mechanism 56 including a cutter support member 58 which carries a blade 60. The blade 60 cuts the image receiving tape 4 and then enters the slot 54. It should be appreciated that the first embodiment will usually also include a cutting mechanism.

These example label printers 1 and 1' may act as stand-alone printing devices including a controller for receiving inputs from a user and to alter what is displayed on a display of the printing devices. Furthermore, the label printers 1 and 1' may also be connectable or connected to a PC, in which case the PC also includes a controller to receive inputs from a user and to alter what is displayed on a display of the printer or of the PC.

Basic circuitry for controlling the label printer 1 of Figure 1 or the label printer 1' of Figure 2 is shown in Figure 3. There is a controller or "control means" (such as a micro controller unit (MCU) or processor) 600, a non-volatile memory 602 which is for example a read only memory (ROM) or a flash type of memory. The flash type of memory may be used in place of, or in addition to the read only memory. A volatile memory comprising a random access memory RAM 604 and/or display RAM is also provided. The MCU 600 is connected to receive label data input to it from a data input device such as a touch panel 608 of a touchscreen 612 via a touch panel controller 606. In alternative embodiments, the data input device may comprises one or more of a hardware keyboard including plural keys, a mouse, a digital pen or tracker ball, or any other means for enabling a user to send commands to the controller 600. In some embodiments, the touchscreen 612 is omitted. The MCU 600 outputs data to drive the display 610 (which together with the touch panel 608 form the touchscreen 612) to display a label to be printed (or a part thereof) and/or a message for the user. Additionally, the MCU 600 also outputs data to drive the print head 18 so that the label data is printed onto the image receiving tape to form a label. Finally, the MCU 600 also controls the motor 7 for driving the platen. The MCU 600 may also control the cutting mechanism 56 of Figure 2 or a cutting mechanism of the device shown in Figure 1 to allow a length of tape to be cut off. In alternative embodiments at least part of the cutting mechanism may be manually operated.

It should also be understood that where the label printer 1 or 1' is connected to an external apparatus such as a PC, then the PC also contains similar components such as at least one memory and at least one processor to enable the PC to carry out the operations of creating a label to be printed. Such a PC will also be connected to a display means such as a monitor.

Hereafter it should be understood that labels may be created on either or both of the label printing apparatus itself or on an external apparatus such as a PC connected to the label printer. Accordingly, it shall be understood that hereafter terms such as "memory", "processor" and "display" may refer to these components on either or both of a label printing apparatus and a PC.

A user interface according to an exemplary embodiment will now be described. Figure 4 shows a user interface 70 displayed on display 610. In Figure 4 a user is presented with a graphical control panel 72 which enables the user to select a label type. In this example the user has selected a 1 inch continuous label type 74, and accordingly this icon has been enlarged to demonstrate to the user that this option is selected.

Other options available to the user via this graphical control panel 72 include patch panel label type 76, cable wrap label type 78, 110-block label type 80, fixed length label type 82, module label type 84, flag label type 86, and breaker label type 88.

At the bottom of the display the user can also select a further option to continue editing 90, to open a folder 92 (from where saved labels can be selected for example), and a settings menu 94 from where printer settings can be adjusted.

Figure 5 shows an exemplary graphical user interface 100 in a further embodiment. In this embodiment it has been detected that a user has inserted a tape cassette containing continuous tape of 0.5" width, as displayed in region 102 of display 610. The graphical user interface 100 displays all types of labels that are available to the user for a cassette of this width. The options available to a user via menu 100 include a general label type 104, a terminal block label type 106, a patch panel label type 108, a flag label type 109, a die-cut flag label type 112, a fixed length label type 114, a 110-block label type 116, a cable wrap label type 118, a heat shrink tubing label type 120, and a self-laminating cable label type 122.

More or less than these types of label may be provided. Additionally or alternatively different types of label may be available.

Additional or alternative types of label comprise one or more of a fuse box label type, a quick label type, a breaker box label type, a distribution panel label type, and a module type.

In Figure 5 the heat shrink tubing label type is shown with an exclamation mark 121. This exclamation mark 121 indicates to the user that such a label cannot be properly printed with the presently inserted cassette.

The user is thus automatically presented with the label types that are available for the particular type of cassette that has been inserted into the printer. This reduces the number of key strokes required for a user to select a suitable label, and also prevents a user from attempting to create a label type that is unsuitable for the type of cassette inserted.

The graphical user interface 100 also includes a region 124 from which a user can select recently created labels. This portion of the menu is separated from the rest of the menu area by a divider line 126.

In another embodiment (not shown) this region 124 may be omitted.

Via this graphical user interface 100 the user can also select to continue editing by selecting icon 128, to open a saved labels folder using icon 130, or to enter a settings menu using icon 132.

The display also shows a battery power level 134, and also the strength of wireless connection 136 for embodiments where the printer is connected to a wireless network.

The menu and user interface structure described above leads the user through the label-creating process.

In some embodiments, once the user is at the label editing stage the display 610 shows a preview of the label in relation to a selected object type. This is shown for example in Figures 6 to 13.

In Figure 6 the user is editing a label 250. The user has already selected "cable wrap" as the label type. The user is now presented on the display 610 with a preview of the label 250 and a preview of the cable 252. To get to this stage the user may have already inputted data related to the label and object, such as the label width and the dimensions of the object. For example the label properties may have been automatically detected by the label printing apparatus upon insertion of a label cassette. The object properties may also have been captured in another way, such as uploading a photograph of the object to the label printing apparatus or external apparatus to which the label printing apparatus is connected. A cursor 254 shows where the text will be displayed once it has been entered by the user. This provides the user with a very accurate representation of how the label 250 will look in relation to the object 252.

Figure 7 shows the same principle but in relation to a patch panel label. The label 256 is shown next to a representation of a patch panel 258. In this example the user is clearly shown how the sections 260, 262 and 264 of the label line up relative to respective ports 266, 268 and 270 of the patch panel 258. Again, the user is provided with an accurate representation of how the label 256 will look when applied to the object, in this case patch panel 258.

The representation of the patch panel consists of single ports with a fixed width and height.

The representation may be changed by one or more of:
Changing the number of ports. This may be done by changing the number of ports in a property menu. The icons may be added to or removed from the right side to depict the set number of ports. In some embodiments, the icon may be added to or removed from the left side or in the middle. The position at which the icons are added or removed may depend on a cursor position.
Changing the centre to centre distance of the ports. This may be done by changing the centre to centre ports in a property menu. The distance between the icons of the ports will depend on the set center to center distance. This may cause the position of each icon to change with respect to for example the icon to the left or right.
Changing the number of groups. This may be done by changing the number of groups in a menu. The number of groups can be one or more.
Changing the port grouping. This may be done by changing the number of ports in a group in a property menu. The ports may be grouped together in dependence on the number of ports in two or more groups.
Changing the group clearance. This may be done by changing the clearance in a property menu. The distance between two groups of ports is based on the group clearance.

In some embodiments, the properties of the patch panel may be shown as different options in a list or menu. The user can change or select the value associated with one or more of the options. Alternatively or additionally one or more of the listed options may take the user to another screen in which the user is able to input one or more values for one or more properties of the patch panel and/or the label.

In this regard, reference is made to Figure 14 which shows an example where the number of groups is two. The first group is referenced 300 and the second group is referenced 301. The distance between the two groups (group clearance) is referenced 304. The number of ports in each group is six. In some embodiments all the groups have the same number of ports. In other embodiments, one or more groups may have a different number of ports to one or more other groups. The port center to port center distance is referenced 305.

In some embodiments, each group of ports has an individual background visually representing the patch panel groups. The background may avoid blank areas (white or unshaded areas) between ports in a group. White or unshaded areas may be provided between groups. In some embodiments, a background is provided behind all ports in a group with a different or no background provided between groups. In some embodiments, no background is provided for all ports in a group and a background between groups.

The background for the ports may have a border which extends above and below the group of ports as well as to the right and left. The background may provide a border around each group.

In some embodiments a border may be provided in addition to or as an alternative to the background.

The label visualization of the patch panel label will have label placeholders with a dynamic width and length. Object boxes (e.g. sections 260) will be provided in dependence on the number of ports. Each port will have an associated object box. The size and position of the object boxes will depend on the properties of the patch panel (number of ports, number of groups of ports, number of ports in each group, group clearance, center to center distance between two ports). As one or more of these properties are changed, the appearance of the label and/or object boxes will change. The length of the label may change. The number of object boxes, the size of the object boxes, and/or the position of the object boxes may change.

In some embodiment, the user may select if two or more groups will have a single label or if one or more groups will share a label. The appearance of the label and respective object boxes will reflect this.

The label width may be selected by a user or may be selected in dependence on the width present in the label cassette.

In some embodiments, the user can select to show or hide a label outline. The user can additionally or alternatively select how the label outline is represented and/or at what location.

The user can additionally or alternatively select if label separator lines are to be shown and if so how.

Figures 8 to 13 show this principle in relation to different objects.

Figure 8 shows a flag label 272 including a flag portion 274. As the user enters text the flag portion 274 will extend so as to accommodate the entered text. Alternatively the flag label 272 may be displayed in relation to a cable which the flag label could be applied to.

Figure 9 shows a representation of a label 276 in relation to a fuse-box 278.

Figure 10 shows a representation of a label 280 next to a representation of a breaker-box 282.

Figure 11 shows a representation of a label 286 next to a representation of a terminal block 288.

Figure 12 shows a representation of a label 284 next to a representation of a 110-block 290.

Figure 13 shows a representation of a label 292 next to a representation of a cable 294.

The following table summarizes for each label type the associated properties associated with that label type and if the properties can be modified.

| Label application | Properties | Editable |
|---|---|---|
| Quick label | • Label orientation<br>• Label outline<br>• Leader/trailer match | Yes |
| General (fixed length) | • Label orientation<br>• Label length<br>• Label outline<br>• Leader/trailer match | Yes |
| Patch panel | • Port numbers<br>  · # ports<br>  · # ports per group<br>• Label setup<br>• Dimensions<br>  · Center on center distance<br>  · Group clearance<br>• Separator lines<br>• Label outline | Yes |
| Breaker | • Breaker numbers<br>  · Number of breakers | Yes |

| Label application | Properties | Editable |
|---|---|---|
| | · Breaker height<br>• Number of poles (for each individual breaker)<br>• Separator lines<br>• Label outline | |
| Module | • Fuse numbers<br>  · Number of fuses<br>  · Fuse width<br>• Fuse multiplier (for each individual module)<br>• Separator lines<br>• Label outline | Yes |
| Cable wrap | • Wire/cable diameter | Yes |
| Self-laminating cable wrap | • Wire/cable diameter<br>• Label outline | No, except for label outline |
| Flag | • Flag type<br>• Flag length<br>• Label outline | Yes |
| 110-block | • Block type<br>• Separator bar<br>• Label outline | No, except for separator bar and label layout |
| Terminal block | • Terminal numbers<br>  · Number of terminals<br>  · Terminal height<br>• Separator bar between labels<br>• Label outline | Yes |
| Distribution panel | • Connector numbers<br>Number of connectors<br>  · Center to center distance<br>• Separator bar<br>• Label outline | Yes |
| Asset tracking | • Label length<br>• Orientation<br>• Label outline | No, except for label outline |
| Heat-shrink tubing | • Label length<br>• Orientation<br>• Label outline | Yes |

In some embodiments, the user can select to show or hide a label outline. The user can additionally or alternatively select how the label outline is represented and/or at what location.

The user can additionally or alternatively select if label separator lines or bars are to be shown and if so how.

In some embodiments, the property setting screens may contain one, two or more values which can be set/changed.

In all of these cases the user is provided with an accurate visual representation of their label next to the object to which the label is to be applied. In some embodiments any label edits will be displayed on the display 610 in real time. Therefore the user will be able to make adjustments as necessary to the label and will be able to see how the label looks relative to the object to which it is to be applied. This provides a user-friendly label-creating experience, and gives the user an accurate preview of how the label will look when it is applied to the selected object.

In some embodiments, thus label application visualization shows an image of the label application that is selected on the home screen. The image changes based on the properties set for the label application. The label application visualization may be a 1:1 mapping of the actual label application: the number of pixels used to represent the label application matches the size of the actual label application. In this way the on-screen label application representation is a good representation of the actual object that is being labelled.

For every label application a specific label application visualization may be supported. The display is thus dependent on a number of parameters which vary per label application and the selected label type/cassette.

While in the label edit screen, the visualization can be changed by changing values in the label property boxes. Making a change will have an immediate effect on the visualization.

Values may be changed by using one or more of: a slider bar to change a value, inputting a desired value, increment or decrementing a current value either in unit values or defined steps and using a value from a drop down menu.

The ways in which a user can navigate through the menus and user interfaces discussed above are various. For example, the user may operate keys on a hardware keyboard of the label printing apparatus to navigate around the display 610. Where the label printing apparatus is connected to an external apparatus such as a PC, the user may use other input means such as a mouse or tracker-pad. Alternatively, where the label printing apparatus has a touch-screen, the user may navigate through the display by directly touching the display.

The skilled person would appreciate that any of the methods described herein may be implemented using a computer program embodied on a computer readable medium (such as a CDROM or memory within a stand-alone printer) for controlling a controller (or other similar apparatus as discussed above).

Embodiments may be used with continuous tape or die cut labels. Die cut labels are provided on a continuous backing layer but are discrete, pre-cut labels. The tape or die cut labels may be provided in a cassette or simply on a roll.

The foregoing merely illustrates the principles of certain embodiments. Modifications and alterations to the described embodiments will be apparent to those skilled in the art in view of the teaching herein. It will thus be appreciated that those skilled in the art would be able to devise numerous techniques which although not explicitly described herein, embody the principles of the described embodiments and are thus within the scope defined by the claims.

APPENDIX SHEET

APPENDIX SHEET

APPENDIX SHEET

APPENDIX SHEET

APPENDIX SHEET

APPENDIX SHEET

APPENDIX SHEET

APPENDIX SHEET

APPENDIX SHEET

What is claimed is:

1. A method comprising:
providing a first image on a label printer user interface, wherein said first image is representative of at least one of at least one label to be printed and at least one object to which a label is to be applied, and a dimension of said first image comprises one or more of a distance between labels to be printed and a distance between two or more objects to which a label is to be applied;
providing a second image on said user interface associated with said first image, said second image representative of said dimension of said first image; and,
enabling a user to modify a dimension of said second image;
wherein as said dimension of said second image is modified, said dimension of said first image is correspondingly updated,
wherein a numerical value of said dimension of said second image is displayed on said user interface, and wherein said numerical value is dynamically updated in real time as said dimension of the second image is modified.

2. A method as set forth in claim 1, wherein said numerical value is displayed adjacent said second image.

3. A method as set forth in claim 1, wherein said numerical value is displayed in a toolbar region of said user interface.

4. A method as set forth in claim 1 wherein said second image comprises an arrow.

5. A method as set forth in claim 1, wherein said second image comprises an arrow.

6. A method as set forth in claim 1, wherein modifying a dimension of said second image comprises selecting and dragging an end of said second image.

7. The method of claim 1, comprising, in providing the first and second images on a label printer user interface, running a computer program stored on a non-volatile computer readable medium, the computer program outputting, to a display driver, data for causing the display driver to drive a display in communication with the computer to display the first and second images on the user interface.

8. An apparatus comprising a controller configured:
to output, to a display driver, data for causing the display driver to drive a display to display a first image on a label printer user interface, wherein said first image is representative of at least one of at least one label to be printed and at least one object to which a label is to be applied; and,
to display a second image on said user interface associated with said first image, said second image representative of a dimension of said first image, said dimension of said first image comprising a distance between labels to be printed or objects to which a label is to be applied;
said controller being configured to enable a user to modify a dimension of said second image;
wherein as said dimension of said second image is modified, said controller is configured to cause said dimension of said first image to be correspondingly updated,
wherein said controller is configured to output data for causing the display to display a numerical value of said dimension of said second image on said user interface, and wherein said numerical value is dynamically updated in real time as said dimension of the second image is modified.

9. An apparatus as set forth in claim 8, wherein said controller is configured to cause said numerical value to be displayed adjacent said second image.

10. An apparatus as set forth in claim 8, wherein said controller is configured to cause the numerical value to be displayed in a toolbar region of said user interface.

11. An apparatus as set forth in claim 8, wherein said second image comprises an arrow.

* * * * *